United States Patent [19]
Voss et al.

[11] Patent Number: 6,006,516
[45] Date of Patent: Dec. 28, 1999

[54] SYSTEM FOR REDUCTION OF HARMFUL EXHAUST EMISSIONS FROM DIESEL ENGINES

[75] Inventors: Kenneth E. Voss, Readington Township, Hunterdon County; Timothy D. Wildman, Monmouth Junction, both of N.J.; Michael G. Norris, Manchester, N.H.; Gary W. Rice, Scotch Plains, N.J.; Anthony J. Rotolico, Hauppauge, N.Y.; Arthur J. Fabel, Amherst, Mass.; Gerald L. Kutner, West Hartford, Conn.

[73] Assignee: Engelhard Corporation, Iselin, N.J.

[21] Appl. No.: 08/838,907

[22] Filed: Apr. 11, 1997

Related U.S. Application Data

[63] Continuation-in-part of application No. 08/635,345, Apr. 19, 1996.

[51] Int. Cl.$^6$ .............................. F01N 3/28; B23D 15/00
[52] U.S. Cl. .............................. 60/299; 60/302; 427/250; 428/623; 422/180; 29/890
[58] Field of Search .................................. 123/668, 669; 60/282, 299, 301, 302; 427/249, 250; 428/623, 472, 551, 552, 555, 556; 422/177, 180; 29/890

[56] References Cited

U.S. PATENT DOCUMENTS

| | | | |
|---|---|---|---|
| 2,780,602 | 2/1957 | Berkman | 252/432 |
| 2,914,048 | 4/1959 | Philip | 123/48 D |
| 2,978,360 | 4/1961 | Bradstreet et al. | 117/104 |
| 3,082,752 | 3/1963 | Thomas | 123/668 |
| 3,109,511 | 11/1963 | Slayter et al. | 181/61 |
| 3,166,895 | 1/1965 | Slayter et al. | 60/299 |
| 3,233,697 | 2/1966 | Slayter et al. | 181/42 |
| 3,302,394 | 2/1967 | Pahnke et al. | 60/302 |
| 3,459,167 | 8/1969 | Briggs et al. | 123/668 |
| 3,649,225 | 3/1972 | Simmons | 29/194 |
| 3,820,523 | 6/1974 | Showalter et al. | 123/668 |

(List continued on next page.)

FOREIGN PATENT DOCUMENTS

| | | |
|---|---|---|
| 0 688 885 | 12/1995 | European Pat. Off. . |
| 2557725 | 6/1977 | Germany . |
| 4242099 | 6/1994 | Germany . |
| 1063859 | 12/1983 | Russian Federation . |
| WO 88/04698 | 6/1988 | WIPO . |
| WO 92/20911 | 11/1992 | WIPO . |

OTHER PUBLICATIONS

Assanis, Dennis et al, The Effects of Ceramic Coatings on Diesel Engine Performance and Exhaust Emissions, International Congress and Exposition, Detroit, Michigan, Feb. 25—Mar. 1, 1991, SAE Technical Paper Series 910460, pp. 1–9.

(List continued on next page.)

Primary Examiner—Willis R. Wolfe

[57] ABSTRACT

Methods and apparatus for reducing the TPM level of a diesel engine exhaust stream by providing a suitable oxidation catalyst into the exhaust train. The oxidation catalyst may be incorporated into a thermal insulative coating on the inner surface of the exhaust train, particularly the exhaust manifold and exhaust pipes prior to the turbocharger. Alternatively, when the exhaust train includes a turbocharger, the catalyst can be in a separate monolithic unit between the engine and the turbocharger. The system may also include an improved diesel oxidation catalyst unit having a metal monolithic substrate. The oxidation catalyst can also be incorporated into a thermal insulative coating inside the cylinders, particularly on non-rubbing surfaces such as The invention also includes the use of a protective mullite top coat on the thermal coating. A further embodiment is the use of a stainless steel bond coat to bind the thermal coating to a metallic substrate, particularly an aluminum substrate.

7 Claims, 5 Drawing Sheets

U.S. PATENT DOCUMENTS

| | | |
|---|---|---|
| 3,873,347 | 3/1975 | Walker et al. ......................... 117/71 M |
| 3,874,901 | 4/1975 | Rairden, III ......................... 117/71 M |
| 3,896,244 | 7/1975 | Ellis et al. ................................. 427/34 |
| 3,899,300 | 8/1975 | D'Olier ..................................... 60/302 |
| 3,911,890 | 10/1975 | Ansdale ................................. 123/179.7 |
| 3,911,891 | 10/1975 | Dowell ..................................... 123/668 |
| 3,928,026 | 12/1975 | Hecht et al. ............................ 75/134 F |
| 3,947,545 | 3/1976 | Ishida et al. ......................... 423/213.7 |
| 3,969,082 | 7/1976 | Cairns et al. ....................... 23/288 FC |
| 3,976,809 | 8/1976 | Dowell ..................................... 427/34 |
| 4,005,989 | 2/1977 | Preston ..................................... 29/194 |
| 4,074,671 | 2/1978 | Pennila ..................................... 123/668 |
| 4,077,637 | 3/1978 | Hyde et al. ......................... 277/235 A |
| 4,122,673 | 10/1978 | Leins ......................................... 60/274 |
| 4,132,743 | 1/1979 | Castor et al. ....................... 260/669 R |
| 4,209,334 | 6/1980 | Panzera ................................... 427/450 |
| 4,254,621 | 3/1981 | Nagumo ................................... 60/282 |
| 4,264,660 | 4/1981 | Siebels ..................................... 428/36 |
| 4,273,824 | 6/1981 | McComas et al. ..................... 428/256 |
| 4,300,494 | 11/1981 | Graiff et al. ......................... 123/193.5 |
| 4,318,894 | 3/1982 | Hensel et al. ........................... 423/212 |
| 4,330,732 | 5/1982 | Lowther ................................... 313/130 |
| 4,332,618 | 6/1982 | Ballard ..................................... 106/84 |
| 4,335,190 | 6/1982 | Bill et al. ............................... 428/623 |
| 4,339,509 | 7/1982 | Dardi et al. ............................. 428/632 |
| 4,353,208 | 10/1982 | Volker et al. ............................ 60/299 |
| 4,401,697 | 8/1983 | Strangman .............................. 427/250 |
| 4,471,017 | 9/1984 | Poeschel et al. ........................ 428/215 |
| 4,485,151 | 11/1984 | Stecura ................................... 428/633 |
| 4,495,907 | 1/1985 | Kamo .................................. 123/193.2 |
| 4,536,371 | 8/1985 | Thayer et al. ........................... 422/171 |
| 4,578,114 | 3/1986 | Rangaswamy et al. ................. 75/252 |
| 4,599,270 | 7/1986 | Rangaswamy et al. ............... 428/402 |
| 4,633,936 | 1/1987 | Nilsson ....................................... 165/8 |
| 4,659,680 | 4/1987 | Guile ....................................... 501/104 |
| 4,706,616 | 11/1987 | Yoshimitsu ......................... 123/41.84 |
| 4,755,360 | 7/1988 | Dickey et al. .......................... 422/122 |
| 4,772,511 | 9/1988 | Wood et al. ............................ 428/325 |
| 4,810,332 | 3/1989 | Honey et al. ............................ 204/16 |
| 4,819,595 | 4/1989 | Pfefferle ................................. 123/272 |
| 4,849,247 | 7/1989 | Scanlon et al. ........................... 427/34 |
| 4,852,542 | 8/1989 | Kamo et al. ............................ 123/668 |
| 4,877,705 | 10/1989 | Polidor .................................. 428/34.6 |
| 4,880,614 | 11/1989 | Strangman et al. ................... 428/623 |
| 4,902,358 | 2/1990 | Napier et al. ........................... 148/127 |
| 4,909,230 | 3/1990 | Kawamura ............................. 123/668 |
| 4,916,022 | 4/1990 | Solfest et al. ........................... 428/623 |
| 4,930,678 | 6/1990 | Cyb ......................................... 228/176 |
| 4,966,820 | 10/1990 | Kojima et al. .......................... 428/622 |
| 5,014,903 | 5/1991 | Cyb ......................................... 228/176 |
| 5,033,427 | 7/1991 | Kawamura et al. ................. 123/193.5 |
| 5,057,379 | 10/1991 | Fayeulle et al. ........................ 428/632 |
| 5,080,977 | 1/1992 | Zaplatynsky ............................ 428/432 |
| 5,085,268 | 2/1992 | Nilsson ....................................... 165/8 |
| 5,151,254 | 9/1992 | Arai et al. ............................... 422/180 |
| 5,236,787 | 8/1993 | Grassi ..................................... 428/552 |
| 5,305,726 | 4/1994 | Scharman et al. ..................... 123/668 |
| 5,320,909 | 6/1994 | Scharman et al. ..................... 428/472 |
| 5,384,200 | 1/1995 | Giles et al. ............................. 428/552 |
| 5,419,126 | 5/1995 | Kiyooka ................................... 60/299 |
| 5,452,577 | 9/1995 | Langer ..................................... 60/299 |
| 5,462,907 | 10/1995 | Farrauto et al. ........................ 502/304 |
| 5,491,120 | 2/1996 | Voss et al. .............................. 502/304 |
| 5,514,482 | 5/1996 | Strangman ............................. 428/623 |
| 5,589,144 | 12/1996 | Filippi et al. ........................... 422/179 |
| 5,714,202 | 2/1998 | Lemelson et al. ...................... 427/249 |

OTHER PUBLICATIONS

Jones, Robert L., Catalytic Combustion in Internal Combustion Engines: A Possible Explanation for the Woschni Effect in Thermally–Insulated Diesel Engines, Naval Research Laboratory, NRL/MR/6170—96-7897, Nov. 15, 1996, pp. i–26.

Kamo, Roy, High Performance Coatings for Diesels and Other Heat Engines, Adiabatics, Inc. Advanced Engine Concepts, Columbus, Indiana Thermal Spray Coatings Conference, Gorham Advanced Materials Institute, Orlando, Florida, Sep. 12,13,14, 1993.

Kawamura, Hideo et al, Improvement of Fuel Consumption and Exhaust Emissions in Ceramics Low Heat Rejection Engine, Isuzu Ceramics Research Institute Co., Ltd., Japan, ICE–Vol.27–1, 1996, Fall Technical Conference, vol. 1, ASME 1996, pp. 69–78.

Klett, D.E., et al, Soot and $No_x$ Emissions and Combustion Characteristics of Low Heat Rejection Direct Injection Diesel Engines, U.S. Army Research Office, Jan. 10, 1994, pp. i–iii, 1–109.

Osawa, Katsuyuki, et al, Performance of Thin Thermal Barrier Coating on Small Aluminum Block Diesel Engine, SAE Technical Paper Series 910461, International Congress and Exposition, Detroit, Michigan, Feb. 25—Mar. 1, 1991, pp. 1–8.

Tree, Dale R., et al, Experimental Results on the Effect of Piston Surface Roughness and Porosity on Diesel Engine Combustion, Society of Automotive Engineers, Inc., 960036, pp. 103–112, Mar. 1996.

Tree, Dale R., et al, Experimental Measurements on the Effect of Insulated Pistons on Engine Performance and Heat Transfer, Society of Automotive Engineers, Inc., 9630317, pp. 131–142, Mar. 1996.

Winkler, Matthew F., et al, The Role of Diesel Ceramic Coatings in Reducing Automotive Emissions and Improving Combustion Efficiency, SAE Technical Paper Series 930158, International Congress and Exposition, Detroit, Michigan, Mar. 1–5, 1993, pp. 1–9.

Wong, Victor W., et al, Assessment of Thin Thermal Barrier Coatings for I.C. Engines, SAE Technical Paper Series 950980, International Congress and Exposition, Detroit, Michigan, Feb. 27—Mar. 2, 1995, pp. 1–11.

Yonushonis, T.M., et al, Engineered Thermal Barrier Coatings for Diesels, SAE Technical Paper Series 890297, Reprinted from SP–785—Worldwide Progress on Adiabatic Engines, International Congress and Exposition, Detroit, Michigan, Feb. 27—Mar. 3, 1989, pp. 133–142.

Afify, E.M., et al, The Effect of Selective Insulation on the Performance, Combustion, and NO Emissions of a DI Diesel Engine, SAE Technical Paper Series 960505, International Congress and Exposition, Detroit, Michigan, Feb. 26–29, 1996, pp. 1–12.

SYSTEM FOR REDUCTION OF HARMFUL EXHAUST EMISSIONS FROM DIESEL ENGINES

This application is a continuation-in-part of U.S. Ser. No. 08/635,345, filed Apr. 19, 1996, pending.

BACKGROUND OF THE INVENTION

1. Field of the Invention

This invention relates to a system for the reduction of harmful exhaust emissions from diesel engines, and more particularly to a system for increasing the effectiveness of the oxidation of the oxidizable components in the exhaust emissions.

2. Description of Related Art

Diesel engine exhaust is a heterogeneous mixture which contains not only gaseous emissions such as carbon monoxide ("CO"), unburned hydrocarbons ("HC") and nitrogen oxides ("$NO_x$"), but also condensed phase materials (liquids and solids) which constitute the so-called particulates or particulate matter ("PM"). The total particulate matter ("TPM") emissions are comprised of three main components. One component is the solid, dry, solid carbonaceous fraction or soot. This dry carbonaceous matter contributes to the visible soot emissions commonly associated with diesel exhaust. A second component of the TPM is the soluble organic fraction ("SOF"). The soluble organic fraction is sometimes referred to as the volatile organic fraction ("VOF"), which terminology will be used herein. The VOF may exist in diesel exhaust either as a vapor or as an aerosol (fine droplets of liquid condensate) depending on the temperature of the diesel exhaust, and are generally present as condensed liquids at the standard particulate collection temperature of 52° C. in diluted exhaust, as prescribed by a standard measurement test, such as the U.S. Heavy Duty Transient Federal Test Procedure, discussed further below. These liquids arise from two sources: (1) lubricating oil swept from the cylinder walls of the engine each time the pistons go up and down; and (2) unburned or partially burned diesel fuel.

The third component of the particulates is the so-called sulfate fraction. Diesel fuel contains sulfur, and even the low sulfur fuel available in the U.S. may contain 0.05% sulfur. Upon combustion of the fuel in the engine, nearly all of the sulfur is oxidized to sulfur dioxide which exits with the exhaust in the gas phase. However, a small portion of the sulfur, perhaps 2–5%, is oxidized further to $SO_3$, which in turn combines rapidly with water in the exhaust to form sulfuric acid which collects as a condensed phase with the particulates as an aerosol, or is adsorbed onto the other particulate components, and thereby adds to the mass of TPM.

Emissions from diesel engines have been under increasing scrutiny in recent years and standards, especially for particulate emissions, have become stricter. In 1994 the particulate emission standards in the U.S. for new engines allowed no more than a total of 0.1 grams per brake horse power hour (g/BHP-h). For diesel engines in buses operating in congested urban areas the particulate emissions standard was even stricter, 0.07 g/BHP-h TPM. Both of these standards were seen as significant reductions relative to the prior particulate emission standard of 0.25 g/BHP-h which had been in effect since 1991. Starting in 1994, for the first time, engine technology developments alone were found to be incapable of meeting the new standards, and for some engines aftertreatment technology, for example, diesel oxidation catalyst (DOC) units, as discussed further below, were necessary.

Current engines are generally capable of meeting the 1994 $NO_x$ emissions standards of 5.0 g/BHP-h, but by only a slim margin. Diesel engines, because they operate with a great excess of combustion air (lean exhaust) typically have emissions of CO and gas phase HC's which are well below the 1994 emissions standards of 15.5 g/BHP-h and 1.3 g/BHP-h, respectively. Therefore, the key emission control concerns for diesel engines now and for the immediate future are the reduction in particulates (TPM) and $NO_x$ emissions.

Emissions of $NO_x$ from diesel engines can be reduced by retarding injection timing. However, this is accompanied by a corresponding increase in particulate emissions, particularly of the dry carbon or soot portion. Emissions of $NO_x$ can also be reduced by applying exhaust gas recirculation (EGR) technology. However, this is also accompanied by a corresponding increase in particulate emissions. Thus, both of these engine technologies are constrained by a trade-off or balance between TPM and $NO_x$ emissions.

Additional EPA requirements went into effect at the beginning of 1995 which apply to urban buses equipped with engines manufactured prior to 1994. These requirements apply to engines in service when they come due for rebuilding. Following engine rebuild the requirements must be met. One portion of these requirements specifies that if technology can be demonstrated for particulate reduction for these pre-1994 bus engines, that technology would be mandated for use on those engines for which it is certified. Two tiers of such technology/emissions reduction attainment were promulgated including:

1. Meet the 1994 Emissions Standard of 0.1 g/BHP-h TPM, with a technology cost cap of about $8,000.
2. Reduce Engine-Out TPM Emissions by at least 25%, with a technology cost cap of about $3,000.

The first of the above attainment levels, which is considered the stricter of the two requirements, if demonstrated and certified, takes precedence. Thus, the 25% TPM reduction tier was considered a "fall-back" position, if the 0.1 g/BHP-h TPM tier could not be met. It is clear from the strict emissions requirements for new diesel engines used in urban buses and the attainment requirement for pre-1994 bus engines that a major challenge exists for this type of application.

Diesel engines used in urban bus applications in the U.S. are of many types, both two-cycle and four-cycle, supplied by a range of engine original equipment manufacturers (OEM's). However, a large percentage of urban transit buses have two-cycle engines from one manufacturer (Detroit Diesel Corp.). The emissions reduction system of this invention is considered to be applicable to any diesel engine for lowering emissions and the level of emissions reduction attained is expected to be dependent on the specific engine, its operating parameters and baseline engine-out emissions. However, this invention has been found to be especially useful for two-stroke diesel engines, and as demonstrated herein, can be used with such engines manufactured prior to 1994 to bring them into compliance with the 1994 particulate emissions standard of 0.1 g/BHP-h TPM, as discussed above.

Oxidation catalysts comprising a platinum group metal dispersed on a refractory metal oxide support are known for use in treating the exhaust of diesel engines in order to convert both HC and CO gaseous pollutants and particulates, i.e., soot particles, by catalyzing the oxidation of these pollutants to carbon dioxide and water. Such catalysts have generally been contained in units called diesel oxidation catalysts (DOC's), or more simply catalytic converters or catalyzers, which are placed in the exhaust train of diesel power systems to treat the exhaust before it vents to the atmosphere. However, by the time the exhaust gas reaches the catalyzer, it has generally lost a considerable amount of heat, both by radiation through the engine and exhaust system walls, and by intentional power transfer at the turbocharger. Because the efficiency of such catalytic oxidation processes is generally a direct function of the gas temperature, such temperature losses can have a significant negative impact on the effectiveness of the catalyzer.

One approach to improving the effectiveness of the catalyzer is to maintain the exhaust temperature at as high a level as possible, from the combustion chamber and through the connecting exhaust train to the catalyzer. Heat-insulating structures and heat-insulating coatings, i.e., thermal barrier coatings have been employed by those skilled in the art to enhance the thermal efficiency of internal combustion engines by permitting more complete fuel burning at higher temperatures. Typically, such heat-insulating coatings have been applied to all of the chamber surfaces, including the cylinder walls and head and piston combustion faces to prevent heat loss. Heat-insulating structures and heat-insulating coatings have also been used in automobile exhaust systems to maintain high exhaust temperatures required by thermal reactors and catalytic converters, thus reducing the emission of unburned hydrocarbons emitted into the atmosphere as an undesirable component of exhaust gas.

U.S. Pat. No. 5,384,200 is directed to particular thermal barrier coatings and methods of depositing such coatings on the surfaces of combustion chamber components. As discussed in that patent, insulating the combustion chamber components reduces the amount of heat loss in the engine. The higher temperature in the combustion chamber results in a more complete combustion of the fuel in the chamber, and also results in a hotter exhaust being delivered to any downstream catalytic converters to promote more effective oxidation of the oxidizable components of the exhaust stream.

The use of thermal barrier coatings has also been suggested for engine components other than in-cylinder surfaces. In a paper entitled "High Performance Coatings for Diesels and Other Heat Engines", by Roy Kamo, presented at the Thermal Spray Coatings Conference, Gorham Advanced Materials Institute, Orlando, Fla., on Sept. 12–14, 1993, it is suggested that engine performance can be improved by applying thermal barrier coatings to various engine components. In addition to in-cylinder surfaces such as the piston crown and cylinder head, the article also suggests the exhaust port, exhaust manifold and turbocharger housing.

SUMMARY OF THE INVENTION

A typical diesel power system includes a diesel engine and an exhaust train through which the exhaust from the diesel engine passes. The present invention is directed to methods and apparatus for reducing the total particulate matter emissions in said exhaust from the diesel engine. One embodiment of the method of the present invention comprises thermally insulating at least a portion of the surface of the exhaust train which comes into contact with the exhaust with a thermal barrier coating, and incorporating an oxidation catalyst into at least a portion of the thermal barrier coating in operative contact with the exhaust. This is accomplished by thermally insulating at least a portion, preferably the hottest portion of the exhaust train which carries the hot exhaust gas stream from the diesel engine to the atmospheric vent. The insulation is applied to surfaces of the exhaust train which are in direct contact with exhaust gas, that is, the inside surfaces of the exhaust train components. The oxidation catalyst is incorporated into at least a portion of the thermal coating, and optionally into substantially all of the thermal coating.

Preferred oxidation catalysts for use in the present invention are base metal oxides, particularly the rare-earth metal oxides, or mixtures of materials containing the base metal oxides or rare-earth metal oxides. Preferred rare-earth oxide catalysts for use in this invention are praseodymium oxide and ceria. Good results are also obtained with other rare-earth oxides, as discussed further below. The base metal oxides can be used alone, or in combination with catalytic platinum group metals, such as platinum, palladium and rhodium.

By insulating the exhaust train in accordance with the present invention, the effectiveness of the oxidation of the oxidizable components of the exhaust is increased in a downstream diesel oxidation catalyst (DOC) unit, and this decreases the level of undesirable emissions in the exhaust. Incorporating an oxidation catalyst into the thermal coating further reduces the emissions, particularly the TPM emissions. The catalyzed thermal barrier and the downstream DOC unit combine for a significant reduction in the overall pollution level in the exhaust.

Typically, the exhaust train of a diesel power system includes a manifold to collect the exhaust from the engine and channel it into one or more exhaust pipes. Being closest to the engine, the manifold is generally the hottest section of the exhaust train. Therefore, in a preferred embodiment of the present invention, at least a portion of the inner surface of the manifold is insulated to reduce the amount of heat lost through the manifold walls and thus maintain the exhaust at high temperature. Preferably, substantially the entire inner surface of the manifold is coated, that is at least about 90% of the area exposed to the hot exhaust gases.

From the manifold, pipes carry the exhaust through various apparatus which may be present in the exhaust train. Typically, a turbocharger is provided downstream of the manifold. Such devices are well known to those skilled in the art. A turbocharger mechanically extracts power from the exhaust stream, such as by a compressor driven by the exhaust, and transfers it to the inlet air stream to improve the overall efficiency of the diesel power system. As a result of such power extraction, the temperature of the exhaust gas generally drops significantly, such as about 100° F. or more, as it passes through the turbocharger. It is therefore a further preferred embodiment of the present invention not only to insulate the manifold, but also to insulate the pipe or pipes connecting the manifold to the turbocharger, when a turbocharger is present.

After the exhaust exits the turbocharger, it is at a lower temperature. Downstream of the turbocharger, many commercial diesel power systems include a diesel exhaust oxidizer (DOC), as discussed above, for oxidizing the oxidizable components of the exhaust stream. Generally, the hotter the exhaust is when it enters the catalytic oxidizer, the more effective the oxidizer is in oxidizing the harmful oxidizable components. It is therefore a further embodiment of the present invention to insulate the pipes connecting the turbocharger to the downstream catalytic oxidizer.

A further embodiment of the present invention is to combine the insulative coating of the exhaust train, as discussed above, with insulative coating of the surfaces of the combustion chamber components, in order to maximize the combustion of the fuel in the combustion chamber and to further impede heat loss from the exhaust stream. The surfaces to be coated can include the piston crown, the cylinder head and the valve faces, as well as any other surfaces which are exposed to the combustion.

As discussed above, catalytic converters in diesel power systems are located in the exhaust train, and the effectiveness of the catalysts in such converters is reduced by temperature loss in the exhaust train. In accordance with one aspect of the present invention the catalytic oxidation of oxidizable components in the exhaust stream is improved by providing catalysts in the thermal barrier coatings which are applied to the exhaust train. By providing the catalysts in the high temperature end of the exhaust train, the catalysts are able to act on the exhaust gas when it is at its highest temperature. Furthermore, because such oxidation is an exothermic reaction, it is possible that this catalytic oxidation may increase the temperature of the exhaust gas, thus promoting more effective oxidation downstream at the catalytic converter.

In another embodiment of the present invention, in which the diesel power system exhaust train includes a turbocharger, the method of reducing the total particulate matter emissions in the exhaust simply comprises providing an oxidation catalyst in the exhaust train between the engine and the turbocharger. In this case, the oxidation catalyst can be mounted on the operating surfaces of a monolithic support, of the type well known in the art. As discussed further below, the ii turbocharger can significantly reduce the temperature of the exhaust gases. By providing catalyst in the exhaust train prior to the turbocharger, the catalytic oxidation can be conducted at the elevated exhaust temperatures before the turbocharger is reached. Optionally, the inner surfaces of the exhaust train can also be insulated, as discussed above. Also, if the surfaces are insulated, additional catalyst can be incorporated into a portion or substantially all of the insulation.

In a further embodiment of the present invention, when the combustion chamber is provided with a thermal barrier coating, an oxidation catalyst is provided on or in such coating in the combustion chamber. Oxidation catalysts in the combustion chamber can promote more complete oxidation of the fuel, thereby decreasing the amount of undesirable emissions sent to the exhaust train.

In a particular embodiment of the present nvention, catalytic ceramic coatings are applied to the in-cylinder surfaces of the combustion chambers of an internal combustion engine, especially a compression ignition (diesel) engine. These coatings are of low thermal conductivity compared with standard metal parts, and provide a thermal barrier at the combustion chamber walls which keeps heat in the cylinder and promotes more complete combustion of the fuel, thereby giving greater fuel efficiency and lower emissions of particulates (SOF and dry-carbon/soot). In addition the coatings are provided with catalytic surfaces which further promote combustion of unburned fuel and particulates for increased efficiency and lower particulate emissions.

Another aspect of the present invention is that it was found that providing smooth and non-porous surface properties to the coatings, also contributes to improved combustion of unburned fuel and soot. This is believed to be the result of low drag at the surface which allows the swirl and mixing of the fuel. Such smooth and non-porous surfaces also reduce adsorption of the fuel which impacts the coated combustion chamber walls. Such adsorption can cause slow and incomplete combustion. The smoothness of thermal sprayed coated surfaces can be further improved by sanding or polishing. The increased smoothness can further reduce drag at the surface and thereby improve the mixing and swirling action of the fuel-air mixture, which in turn leads to better combustion.

In a particular embodiment of the present invention a top coat of mullite is used to protect the ceramic coating. The ceramic coatings are essentially the same as otherwise described herein for insulative coatings, except that a top layer of an alumino-silicate (mullite) ceramic layer is provided. The layer should be at least about 2 mils thick, and preferably about 3 to 5 mils thick. Under this typically is the yttria-stabilized zirconia layer and beneath that the bond coat. These coatings are therefore three layer coatings with an overall thickness approximately the same as the above coatings without mullite. The reason for the mullite top layer is to provide a very chemically inert ceramic surface with high resistance to the corrosive and aggressive materials encountered in the combustion and exhaust (sulfur and sulfates, calcium, zinc, nitrogen oxides and nitrates, chlorides, phosphorus, etc.). The "as sprayed" mullite top layer is less porous (about 3% porosity) than the zirconia layer, which is about 10% porosity.

The combustion chamber surfaces which are coated with the catalytic materials, such as catalytic oxides, will be at least the crowns (including the bowls of pistons which have bowls for receiving injected fuel, as is well-known in the art). The exhaust valves and cylinder head fire decks can also be coated with the catalytic oxides. The overall coating thickness should be relatively thin, for example, less than about 20 mils. and preferably less than about 15 mils. These thicknesses are the total of all coatings, such as a bond coat, ceramic thermal barrier layer(s) and catalytic oxide layer(s). This thickness criteria is to produce a coating with good thermo-mechanical properties and which will exhibit good long-term durability in-cylinder.

Another aspect of this invention is the use of stainless steel bond coats, particularly martensitic steels, to give good durability when the coatings are applied to aluminum alloy surfaces. Aluminum alloy pistons are used in many internal combustion engines, thus the need for the special bond coat. The typical alloy bond coats used with prior thermal spray coatings have been comprised of MCrAlY alloys where M=Ni, Co, Fe, etc., as is well-known in the art. In accordance with the present invention, stainless steel, particularly martensitic stainless steel, such as type 431 SS, has been found to be particularly useful as a bond coat to bond ceramics, such as yttria stabilized zirconia, to aluminum substrates.

It is believed that the reason such stainless steels are effective as bond coats is related to the relative coefficients of thermal expansion (CTE) of the components. Aluminum has a CTE of about 23.0, and aluminum alloys have CTE's in the general range of about 21 to 25. The ceramic thermal barrier coatings have CTE's of roughly about 6 to 8, with standard 7% yttria stabilized zirconia being about 7.6. The stainless steels used in the present invention, particularly martensitic stainless steels, have relatively low CTE's, which approximate those of the ceramic thermal barrier oGoatings. Such steels are commonly referred to as being "low-shrink", because of their relatively low CTE. At the same time, such stainless steels also bond well to the aluminum substrate. It is believed that the use of a stainless steel which has a coefficient of expansion relatively close to that of the ceramic coatings acts to keep the ceramic firmly adhered to the aluminum. The CTE of type 431 SS martensitic stainless steel is about 6.6, which is even less than that of the yttria stabilized zirconia used as the thermal barrier coating in some of the examples below. The stainless steel bond coat does not move differentially to the zirconia ceramic, and remains firmly anchored to the aluminum substrate. As a result, the tendency for the coating to crack and spall off such aluminum substrates is greatly reduced A further aspect of the present invention is providing an improved diesel oxidation catalyst (DOC) unit in the exhaust train. The improved DOC unit more effectively oxidizes the oxidizable components of the exhaust stream, thus reducing the TPM level of the exhaust. The improved DOC unit comprises a metal monolithic catalyst support rather than a ceramic support as used in other units.

DETAILS OF PREFERRED EMBODIMENTS

Figure 1:
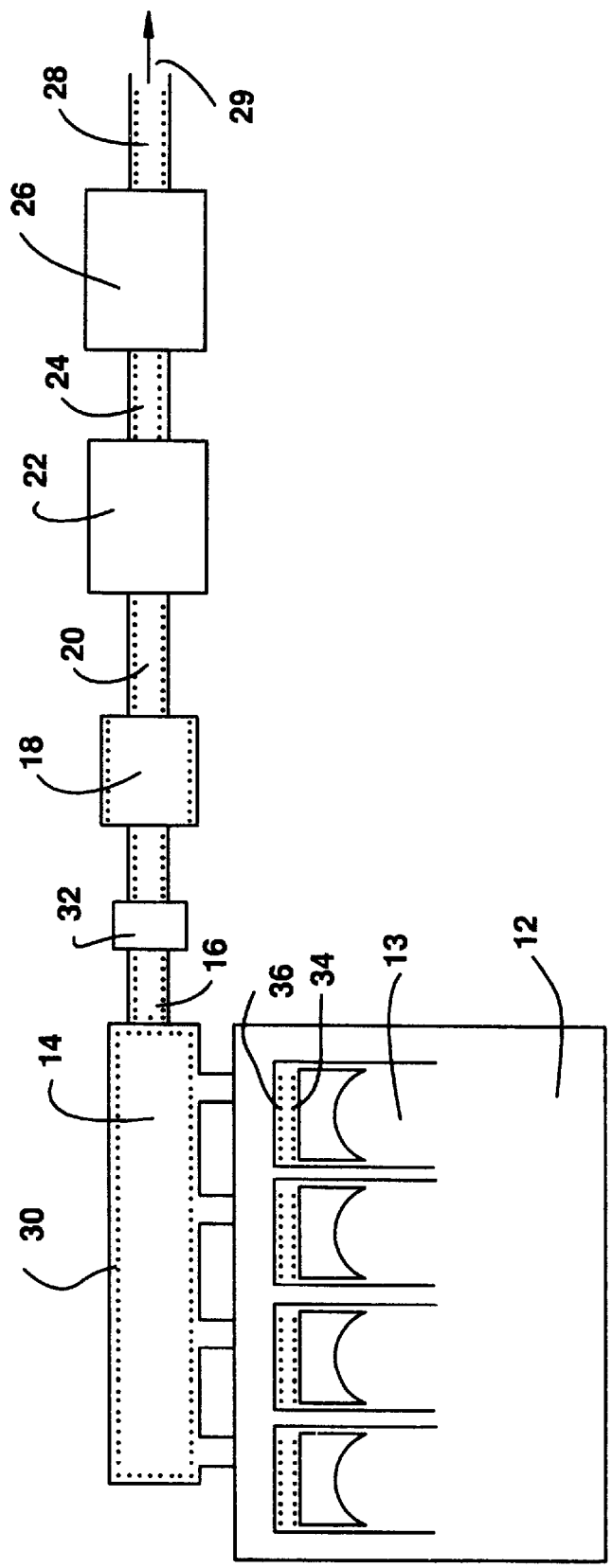
FIG. 1 is a schematic representation of a diesel power system.

A simple, generalized schematic of a diesel power system 10 such as is used in commercial buses is depicted in FIG. 1. Diesel fuel is combusted in one or more cylinders 13 of diesel engine 12. The exhaust from diesel engine 12 is collected in exhaust manifold 14 and channeled downstream by one or more pipes 16. The exhaust train of such diesel systems generally includes a turbocharger 18, which extracts power from the exhaust and transfers it to the air intake of the engine 12 by means which are well known in the art. After turbocharger 18, pipe 20 carries the exhaust downstream to an optional diesel oxidation catalyst (DOC) unit 22, or more simply a catalyzer, in which a catalyst is provided to promote the oxidation of harmful emissions contained in the exhaust. Downstream of catalyzer 22 pipe 24 carries the exhaust to a muffler 26 from which the exhaust exits through pipe 28 to the atmosphere. Optionally and preferably, catalyzer 22 and muffler 26 are combined into a single catalyzer/muffler unit, thus eliminating the need for two separate units and intermediate connecting pipes.

The exhaust gas exiting engine 12 is at elevated temperature, and cools as it passes through the exhaust train. In particular, when a turbocharger is Ipresent, the temperature of the gas is significantly reduced by the process which transfers power to the inlet air. The temperature drop across the turbocharger can be in excess of about 100° F. In any case, as the exhaust gas moves through the manifold and down the exhaust train to the atmosphere, the gas loses heat through the walls of the exhaust train by radiation or other heat transfer means.

In accordance with a preferred embodiment of the present invention, an insulative layer 30 is provided on the inner surface of at least a portion of the exhaust train. Although insulative layer 30 is shown on the inside of manifold 14, turbocharger 18 and connecting pipes 16, 20, 24 and 28, it is not necessary for all of these surfaces to be coated to achieve the desired improvement in the oxidation of the oxidizable exhaust components. The exhaust gas is generally at its hottest temperature when it leaves the engine, and it is more effective to insulate the hottest components of the exhaust train to maintain the exhaust at the highest possible temperature. Therefore, it is preferred to at least insulate part of the manifold, more preferably substantially the entire manifold, that is, at least about 90% of the surface exposed to the exhaust gas. When a turbocharger is in the system, it is also preferable to insulate the pipe 16 connecting the manifold to the turbocharger. After the exhaust gas passes through the turbocharger, it is at a significantly lower temperature, therefore insulating the piping downstream of the turbocharger is not as significant to the overall improvement of oxidation efficiency. Because one of the purposes of insulating the exhaust train is to increase the effectiveness of the catalyzer unit 22, there is little to be gained in regard to emissions control by insulating the exhaust train downstream of the catalyzer.

In one embodiment of the invention, an oxidation catalyst is incorporated into at least a portion of the thermal insulative coating 30. Preferably, the catalyst is provided in the highest temperature regions of the exhaust stream, that is in the manifold 14 and the pipe 16 connecting the manifold to the turbocharger 18. The catalyst can be disposed on selected portions of the insulated surface 30, or on substantially all (that is, at least about 90%) of the insulated surface.

Optionally, a separate oxidation catalyst unit 32 may be provided upstream of the turbocharger. This unit can include a monolithic catalyst support, as is well known in the art, on which the oxidation catalyst is disposed. Such a catalyst unit can be provided in place of incorporating catalyst into coating 30, or can be in addition to catalyzed coating 30. When a catalyst unit 32 is provided, it is not necessary to insulate the exhaust train with coating 30. However, preferably at least the exhaust manifold 14 and the connecting pipe 16 are insulated, as discussed above.

Optionally, the inner surface of the cylinders 13 can also be coated with either catalyst, thermal barrier insulation, or catalyst incorporated into thermal barrier insulation, as discussed above. The preferred sites for coating in-cylinder are the piston crown 34 or the cylinder head 36, also known as the firedeck, and valve faces. When coating in-cylinder, appropriate adjustments would also have to be made to maintain the desired compression, as would be understood by one skilled in the art.

The preferred catalysts are oxidation catalysts which can combust the hydrocarbons (referred to as SOF or VOF) and carbonaceous materials (referred to as insolubles or soot) which make up nearly all of the total particulate mass (TPM) emitted in the exhaust of diesel engines. The catalysts used for this invention include base metal oxides with activity for burning SOF and/or insolubles. These oxides can be used in combination with one another, or also optionally in combination with precious metals (e.g. Pt, Pd, Rh, etc.), to get enhancement in overall activity some cases. Test results demonstrating relative performance of different base oxides and their combinations are given below.

The base metal oxide combustion catalysts can be used in and with a diesel engine system in a number of ways for destroying SOF and insolubles, thereby reducing TPM emissions.

The catalysts can be used within the combustion chambers of the diesel engine. They can be applied to the combustion chamber surfaces, including the piston crowns, valve faces and firedeck area of the cylinder heads. These are surfaces which can come into contact with SOF and insolubles which can be burned there. This is especially true of the piston crowns which are known to encounter impingement of at least a portion of the fuel or partially burned fuel directly on their surfaces following fuel injection. In addition, optical observations have shown high concentrations of soot at the outside of the flame and near the piston crown surfaces. The catalysts can be applied directly to the combustion chamber surfaces as a coating or they can be applied onto the surface of another coating which as already been put onto the combustion surfaces, such as a thermal barrier coating. This can have an added benefit in that the thermal barrier coating can keep heat in the cylinder and provide a surface to keep the catalyst hot and thereby more active, plus it can provide a stable, compatible surface for applying the oxide catalyst. The catalysts could be applied to the above mentioned surfaces by a variety of means known to the art including: impregnation with a solution of soluble precursor followed by thermal or chemical decomposition to obtain the active oxide, thermal spraying processes such as flame spraying or plasma spraying of the oxide catalysts or their precursors, or by application of a slurry of the catalyst material together with appropriate binders, if needed, followed by thermal treatment to dry, cure and set the catalyst coating.

The catalysts can also be applied as a coating, in manners such as those described above, to the internal surfaces of the exhaust system of the engine, including the ports in the cylinder heads, exhaust manifolds, exhaust pipes and turbocharger housing. As discussed above, the exhaust is significantly cooled as it passes through a turbocharger. Therefore, the catalysts are especially useful in the exhaust system sections prior to the exhaust reaching the turbocharger, where the exhaust temperature is at its highest, thereby providing the most sensible heat for enhanced catalyst activity. As with the in-cylinder coatings above, the catalyst can be applied directly to the inner surfaces of the exhaust system components or applied to the surface of another coating, e.g. a thermal barrier coating, which has already been put onto the surfaces. The benefits of incorporating the catalyst into the surface of the thermal barrier coating would be the same as those described in regard to in-cylinder usage above.

In some engines, such as Detroit Diesel's 6V92TA, there is a relatively long run of exhaust manifolds and piping connecting the exhaust ports with the turbocharger. This particular engine has seven sections of connecting pipes, including two exhaust manifolds (it's a V-configuration engine), two connector pipes, one from each manifold, which feed into a Y-connector, which in turn is connected to a turbo-extension pipe, which finally connects to an elbow connector, which is connected to and feeds the combined engine exhaust to the turbocharger. This pre-turbo exhaust system not only provides a relatively large interior geometric surface area onto which to put a catalyst coating, as described above, but also has several straight runs of piping with sufficient inner diameter which could be fitted or configured with a catalyst coated flow-thru honeycomb substrate, such as that depicted as component 32 in FIG. 1 and discussed above.

Such a separate catalyzed honeycomb unit 32 can provide a much greater geometric surface area for contacting the catalyst with the exhaust, thereby enhancing overall effectiveness and activity for TPM reduction. For example, the turbo connector pipe noted above has an inner diameter of 3.31" with a length of 11.38" which could accommodate a flow-thru catalytic element. Such a catalyst would be near the engine exhaust port, and before the turbocharger. This would provide for higher temperatures for the catalyst and thereby better activity and more rapid "light-off" after initial engine "start up", these terms being well known in the art, for burning the VOF and insoluble components of the TPM's. A metallic monolithic flow-thru honeycomb would be an especially good candidate as a substrate to place in a such a high temperature and pressure position, because of good mechanical strength and relatively low pressure drop. Another advantage of a metallic substrate is that they are typically made by wrapping corrugated metal foils in layers from the inside out, thereby allowing the fabrication of practically any diameter substrate to fit any inner diameter of exhaust piping. The oxide catalysts, possibly in combination with one or more precious metals, can be coated onto the metallic flow-thru substrate as a washcoat by conventional techniques, including dip-coating or flow coating. The preferred catalytic materials for use in the configurations described above have been defined, at least initially, by laboratory testing which is described below.

Laboratory Testing

The identification of candidate catalysts and ceramic coating materials was first determined by laboratory testing. A test was developed to screen various materials for their capabilities to catalyze the combustion of diesel particulates. For the test, the diesel particulates were simulated by a mixture of lube oil (model SOF) and carbon black (model soot). The lube oil and carbon black were mixed in the ratio of 30:70 to approximate their proportions in representative diesel particulate emissions. The lube/carbon black mixture was further combined with a powdered sample of the candidate catalyst material in the ratio of 20 parts model particulate and 80 parts catalyst to form a uniform, intimate mixture. The performance of the candidate catalyst for burning the admixed model particulates was evaluated using a thermogravimetric/differential thermal analysis unit (TGA/DTA; STA 1500, Polymer Labs). In a given test run a small sample (e.g., 30 mg) of the catalyst/model particulate mixture was placed in the sample pan of the TGA/DTA and heated in a flow of air from ambient temperature to about 1000° C. at a ramp rate of 20° C./min. The TGA/DTA unit was used to simultaneously measure the weight loss and heat evolution from the test sample as a function of temperature. The test was conducted with an atmosphere of flowing air to simulate the lean environment found in diesel exhaust.

Figure 2:
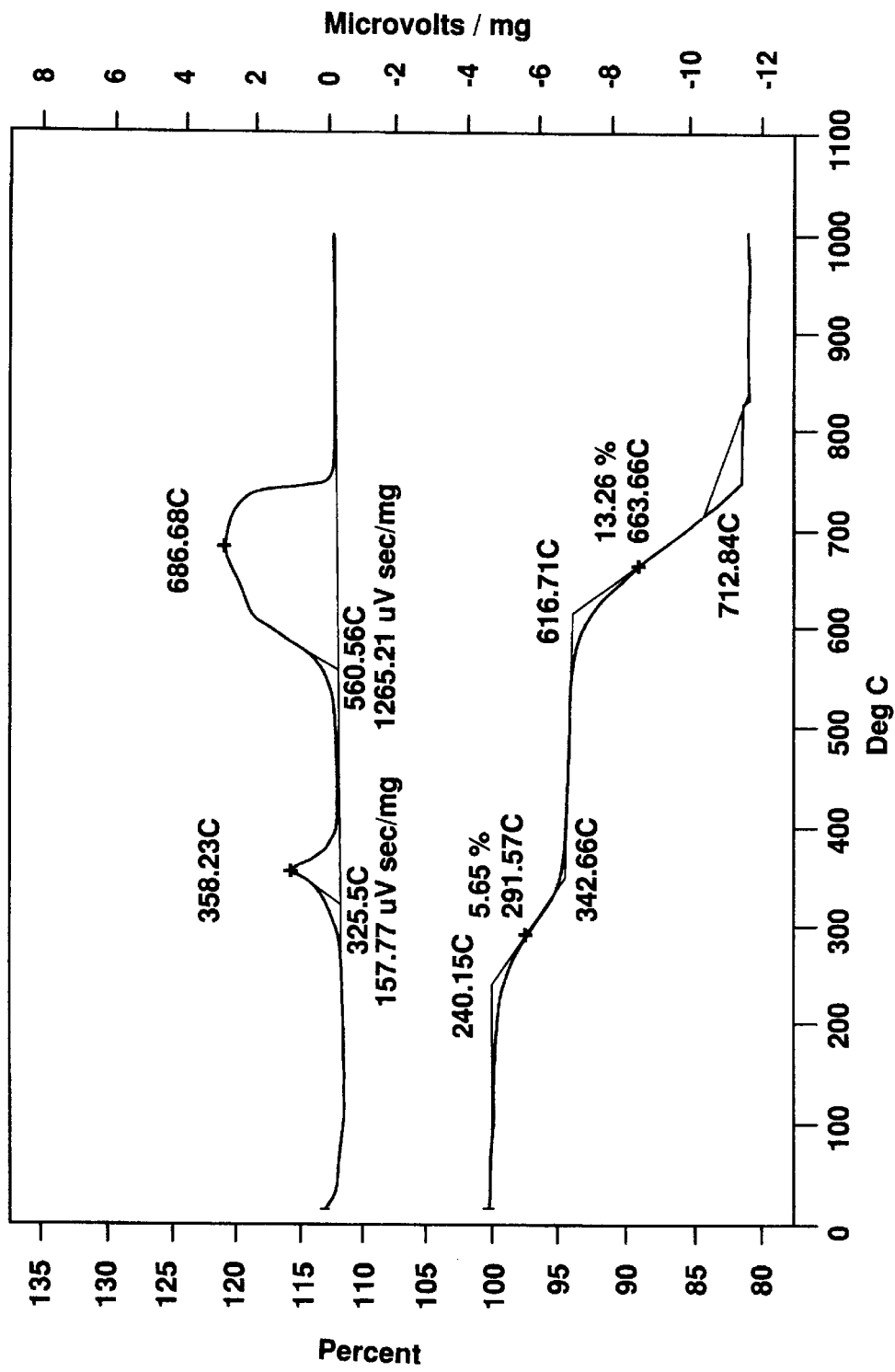
FIG. 2 is an illustrative graphical printout of a combined thermogravimetric/differential thermal analysis (TGA/DTA) for an active catalyst, in this case containing ceria.

The results from a representative test run of a candidate catalyst are shown in FIG. 2. The sample weight loss (TGA, lower trace) exhibits two breaks at different temperatures. The lower temperature break (about 240–343° C.) is due to the loss of the lube oil (volatilization+combustion), and the higher temperature break (about 617–713° C.) is due to the combustion of the carbon black. The heat evolution (DTA, upper trace) due to combustion of lube and carbon black are seen as separate peaks (exotherms) in the curve at about 358° C. and 687° C., respectively. All catalyst candidates exhibited the two breaks for weight loss in the TGA trace as the lube and carbon black were burned, respectively. However, some catalyst candidates exhibited little or no activity for burning the lube oil and as a result exhibited no DTA peak in the lube oil temperature range and all the lube oil loss was due to volatilization alone. This can be seen in FIG. 3 for cordierite powder, an inert material, which was mixed with the model particulate mixture and run in air. As can be seen, cordierite is completely inactive for burning lube oil and the weight loss in the temperature range of 236° C. to 334° C. is due entirely to volatilization of the lube.

Figure 3:
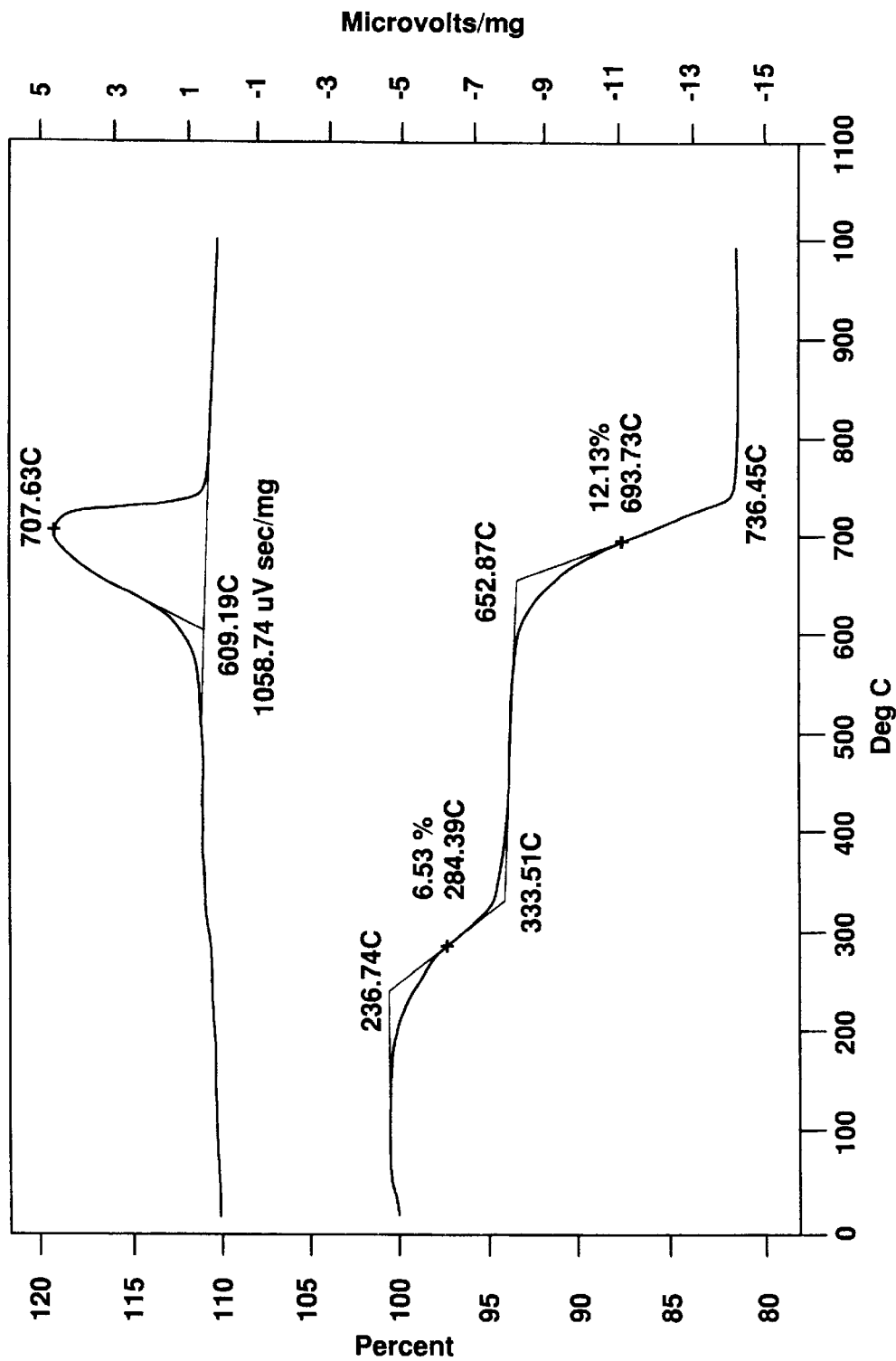
FIG. 3 is a printout of a TGA/DTA for relatively inert cordierite.

The carbon black is a nonvolatile solid and thus all samples exhibited a DTA peak in the carbon black temperature range due to combustion. As can be seen, even with an inert material such as cordierite a carbon black DTA peak is obtained, as shown in FIG. 3.

Catalyst candidates differed in performance for burning the lube and carbon black, as evidenced by the temperatures at which the lube oil and carbon black combustion occurred. For the screening tests the figure of merit was taken as the temperature of the inflection in the weight loss curve (maximum rate of weight loss) and the temperature of the peak in the DTA curve (maximum rate of heat evolution from combustion). The best candidate catalyst materials were those which exhibited the lowest temperatures of TGA inflection and DTA peak for the combustion of lube and carbon black. That is, the best catalyst materials shift the burning of lube or carbon black to the lowest possible temperature. This can be seen for carbon black burning by comparing the DTA Peak temperature for the catalyst candidate run in FIG. 2 (687° C.) to that for cordierite in FIG. 3 (708° C.).

The catalyst candidates screened in this test procedure were mainly metal oxides, although non-oxides are within the scope of this invention and similar screening tests can be performed on representative samples. In addition, oxides or non-oxides in combination with one or more precious metals is considered within the scope of the invention.

Pure metal oxides were tested and mixtures of metal oxides were tested. For the latter some were based on candidate catalytic metal oxides impregnated onto low surface area, non-active oxides via solution impregnation from a water soluble precursor followed by calcination in air. The metal oxides chosen have been of both low and high surface area and were tested in powder form as described above. The low surface area oxides were of special interest because for this invention the form envisioned is of a ceramic coating applied to metal substrates such as piston crowns, valves, cylinder heads, exhaust manifolds and exhaust pipes by methods such as thermal spray techniques (plasma or HVOF spraying), and as a result lower or very low surface area coatings are expected to result. These coating techniques are known to give thermo-mechanically stable and highly adherent coatings which would be needed for the in-cylinder parts. Higher surface area oxides are also considered because of the potential to apply them to the substrate by slurry or wet coating processes. This could be done for the exhaust pipes which are exposed to less extreme thermo-mechanical conditions than are in-cylinder parts. Furthermore, both high surface area and low surface area oxides or ceramic materials would be candidates for catalysts to be used in enhancing TPM insolubles or dry carbon burning in diesel oxidation catalyst units or catalyzed diesel soot filters.

Test results for a series of candidate oxides and mixed oxide systems are given in Table I. In Table I, the TGA inflection temperatures and DTA peak temperatures are given for each candidate, and the results showed significant variations for different candidates. For purposes of the present invention, the lowest possible temperature is desired for DTA peak and TGA inflection. As will be shown by the results presented below, it is of particular importance for the catalyst to affect the combustion of the carbon component of the TPM, because the downstream diesel oxidation catalyst units have been found to be much more effective on the VOF component than on the dry soot. Therefore, the best candidate catalysts for use in the present invention are those with the lowest DTA inflection and TGA peak temperatures for carbon black combustion. These results indicated that praseodymium oxide ($Pr_6O_{11}$) showed a significant ability to decrease the TGA and DTA values for dry carbon burning, especially Samples 21 and 23–27.

High surface area cerium oxide (Sample 20) also showed very good combustion characteristics (low TGA and DTA values) for carbon black burning. In addition, this cerium oxide (Sample 20) also was the best for burning the lube oil component of the model particulates (i.e., lowest DTA peak temperature). As can be seen from Table I, samples of cerium oxide with lower surface areas (e.g., Sample 16 with SA=0.9 $m^2/g$ and Sample 17 with SA=8.9 $m^2/g$) did not exhibit as low TGA and DTA values for carbon black combustion as did Sample 20. This shows that with ceria, surface area, and specifically high surface area, is important for obtaining the best activity for carbon black combustion, as well as lube oil combustion. Thus, high surface area cerium (or cerium containing) oxides are included as preferred catalysts.

Praseodymium oxide, also a preferred catalyst, can be seem form Table I to be highly active for carbon black combustion. Furthermore, praseodymium oxide is highly active with a low surface area (3.7–23 $m^2/g$, Samples 23–25). Thus, surface area of praseodymium oxide is not as important a factor for high carbon black combustion activity as is for ceria. However, praseodymium oxide does not exhibit as high an activity for lube oil combustion.

TABLE I

Laboratory TGA/DTA Test Results with Various Oxides for Lube Oil & Carbon Black Combustion in Air

| Sample | Catalyst | SA ($m^2/g$) | TGA Inflection Temp. (° C.) | | DTA Peak Temp. (° C.) | |
|---|---|---|---|---|---|---|
| | | | Lube Oil | Carbon | Lube Oil | Carbon |
| 1 | alpha-Alumina ($Al_2O_3$) | 8.9 | 287 | 697 | 388 | 687 |
| 2 | Mullite (alumina-silica) | <1 | 278 | 688 | None | 698 |
| 3 | Cordierite Powder | <1 | 284 | 694 | None | 708 |
| 4 | Chromium Oxide ($C_2O_3$) | 2.9 | 294 | 649 | 387 | 651 |
| | | | 279 | 637 | 407 | 625 |
| 5 | Yttrium Oxide ($Y_2O_3$) | 10.3 | 290 | 685 | 371 | 707 |
| 6 | Zirconia ($ZrO_2$, Yttria Stabilized) | 0.4 | 286 | 641 | None | 632 |
| 7 | Lithium Niobate | 0.9 | 291 | 687 | None | 712 |
| 8 | Niobium(V) Oxide ($Nb_2O_{10}$) | 1.7 | 290 | 712 | 399 | 699 |

TABLE I-continued

Laboratory TGA/DTA Test Results with Various Oxides for
Lube Oil & Carbon Black Combustion in Air

| Sample | Catalyst | SA ($m^2/g$) | TGA Inflection Temp. (° C.) | | DTA Peak Temp. (° C.) | |
|---|---|---|---|---|---|---|
| | | | Lube Oil | Carbon | Lube Oil | Carbon |
| 9 | Terbium Oxide ($Tb_6O_{11}$) | 1.2 | 303 | 660 | 300 | 693 |
| 10 | Europium Oxide ($Eu_2O_3$) | 5.6 | 306 | 665 | 353 | 667 |
| 11 | Samarium Oxide ($Sm_2O_3$) | 1 | 301 | 669 | 337/394 | 703 |
| 12 | Tantalum(V) Oxide ($Ta_2O_{10}$) | 0.3 | 288 | 679 | 331 | 680 |
| 13 | Ceria ($CeO_2$), 7 wt % on Mullite | | 280 | 687 | 382 | 718 |
| 14 | Ceria ($CeO_2$), 7 wt % & Pt 0.1 wt % on Mullite | | 292 | 664 | 358 | 687 |
| 15 | Ceria ($CeO_2$), 10 wt % Citrate Process & Pt 0.1 wt % on Cordierite | | 271 | 637 | 344 | 604 |
| 16 | Ceria ($CeO_2$) 99.9% | 0.9 | 289 | 703 | 403 | 728 |
| 17 | Ceria ($CeO_2$) 90% | 8.9 | 307 | 646 | 369 | 638 |
| 18 | Ceria ($CeO_2$) 96% | | 282 | 677 | 406 | 671 |
| 19 | Ceria ($CeO_2$) 96% After Plasma Spraying | | 290 | 703 | None | 709 |
| 20 | Ceria ($CeO_2$) 99% | 165 | 252 | 584 | 236 | 541 |
| 21 | Praseodymium Oxide ($Pr_6O_{11}$) 7 wt % on Mullite | | 275 | 653 | 410 | 662 |
| 22 | $Pr_6O_{11}$ (10 wt % Citrate Process & Pt 0.1 wt % on Cordierite) | | 284 | 692 | 390 | 708 |
| 23 | $Pr_6O_{11}$ | 4 | 297 | 593 | 285/399 | 572 |
| 24 | $Pr_6O_{11}$ (96%) | 3.7 | 303 | 612 | 445 | 581 |
| 25 | $Pr_6O_{11}$ (HSA) | 23 | 299 | 565 | 317/414 | 540 |
| 26 | $Pr_6O_{11}$ (HSA) with 1 wt % Pt | | 277 | 591 | 328 | 564 |
| 27 | $Pr_6O_{11}$ (96%) after HVOF spraying | | 306 | 607 | 386 | 591 |
| 28 | $CeO_2$ (96%) & $Pr_6O_{11}$ (96%) mixed in 70:30 ratio then plasma sprayed | | 293 | 693 | 336 | 693 |

Note: HSA = High Surface Area.

EXAMPLES

The emissions reduction system which constitutes the present invention was tested and demonstrated by engine tests conducted using a two-cycle diesel urban bus engine. The tests were conducted in accordance with the U.S. Heavy Duty Transient Federal Test Procedure (FTP), defined in 40 CFR, Part 86, Subpart N (1995), incorporated herein by reference. The FTP outlines the specific requirements for setting up, mapping and running a test engine for the performance and emissions evaluation. A standardized 20-minute transient test cycle was used, including rapid changes of speed and torque which the engine must produce. The tests were run using 1994 emissions grade #2 diesel fuel (0.05 wt % S). Both cold start (after an overnight equilibrium soak period) and hot start transient tests were run and the data collected. Composite results of both cold and hot start transients were reported for certification purposes. The composite results were calculated as a weighted average of the cold start (1/7) and hot start (6/7) transient results as required by the FTP. For some engine configurations only hot start transient data were collected to assess the relative contribution of the components comprising that configuration. The key results included determination of brake specific emissions (TPM, $NO_x$, gas phase HC's and CO) and TPM breakdowns (insolubles, VOF) expressed in g/BHP-h. Engine fuel consumption was also determined (lb/BHP-h).

The Test Engine and Test Strategy

The test engine was a MY 1987 DDC 6V-92TA MUI (Serial #6VF120195), which was a 6 cylinder, two-cycle diesel engine with a V-configuration and having a displacement of 9.05 liters (552 cu. in.). The engine was turbocharged, aftercooled and had mechanical governing and mechanical unit fuel injectors. This engine is typical of those used in a large proportion (about 40%) of urban transit buses. The engine developed about 294 HP at 2100 RPM.

The engine was rebuilt and configured to give various test cases for evaluation using the U.S. HD Transient Test (FTP). These configurations (examples) included the components of the current invention, as well as, other configurations (examples), including a baseline, for comparative purposes. The exhaust system used for testing and included the fittings for incorporation of the exhaust catalyst (DOC) into the exhaust train. The DOC element was located, for these tests, 6 feet downstream of the exhaust manifold. The engine was run on a break-in cycle for at least 75 hours prior to the tests.

Fuel injection timing for the engine was controlled by the injector "height" setting and was varied in the tests from 1.460" to 1.520" with the greater injector height being a more retarded injection configuration. Most of the test runs were done at an injection setting of 1.466". The throttle delay for the tests was set at 0.594".

Ceramic Coatings: The catalyzed and non-catalyzed ceramic coatings used in the examples below to demonstrate the invention are described below:

1. Non-catalyzed Insulative Coatings: These coatings, referred to as "Coating A", are basic ceramic coatings applied to a metal surface via the plasma spray process, as are well-known in the art. The plasma sprayed coatings were applied by Engelhard Surface Technologies in East Windsor, Conn. Such coatings consist of:

a. A metal alloy bond coat (e.g. super alloy or 431 SS) which acts as an interlayer between the metal surface of the part and the ceramic layer. Particularly good results are obtained using a well-known class of metal-chromium-aluminum-yttrium alloys, commonly referred to as MCrAlY alloys, wherein the metal is preferably nickel, cobalt, iron or combinations thereof. Such alloys are well known in the art, as for example, in U.S. Pat. No. 5,384,200, cited above and incorporated herein by reference.

b. An yttria-stabilized zirconia ceramic layer (e.g. 7–20 wt % yttria) deposited on top of the bond coat.

The coatings used for the present invention are relatively thin (<15 mils thick) compared with those typically used in the art (>60 mils thick). This gives them better thermo-mechanical stability and thereby good durability to survive the temperature gradients and stresses encountered in the combustion chamber of the engine. The bond coat layer for these coatings is typically 3–5 mils thick with the remainder comprising the yttria stabilized zirconia. The porosity of the yttria-stabilized zirconia can be controlled by adjusting the plasma spray parameters, but typical for this application is about 10% porosity.

2. Non-catalyzed Mullite Insulative Coatings: These coatings have the same basic structure as the above non-catalyzed insulative coatings, except that the top-most 3–5 mils thickness is comprised of an alumino-silicate (mullite) ceramic layer. Under this is the yttria-stabilized zirconia layer and beneath this is the bond coat. These coatings are therefore three layer coatings with an overall thickness approximately the same as the above coatings without mullite. The reason for the mullite top layer is to provide a very chemically inert ceramic surface with high resistance to the corrosive and aggressive materials encountered in the combustion and exhaust (sulfur and sulfates, calcium, zinc, nitrogen oxides and nitrates, chlorides, phosphorus, etc.). The "as sprayed" mullite top layer is less porous (about 3% porosity) than the zirconia layer, which is about 10% porosity. In the following examples, the mullite non-catalyzed insulative coating is designated "Coating B", and comprises the same first two layers as Coating A, with a mullite top coat.

The non-catalyzed mullite insulative coating used in the examples below and identified as "Coating B" comprised a nominal 4 mil thick bond coat of NiCrAlY alloy and a nominal 7 mil thick ceramic layer of 8% yttria stabilized zirconia. On top of the ceramic layer, a nominal 2 mil thick layer of mullite was deposited.

3. Catalyzed Insulative Coating: These coatings are catalyzed versions of the above non-catalyzed or mullite non-catalyzed insulative coatings. The specific catalyzed coating used in the examples below consisted of the above Coating B applied by a plasma spray process which had been impregnated with a candidate metal oxide catalyst, and is designated "Coating C". In this case the catalytic metal oxide was praseodymium oxide ($Pr_6O_{11}$) which was applied to the Coating B surface (and pores) via an aqueous solution of praseodymium nitrate precursor, followed by drying and thermal decomposition of the nitrate to the corresponding oxide. This was done in three applications to achieve a praseodymium oxide loading equivalent, for example, to about 0.25 g of $Pr_6O_{11}$ on the surface of a coated piston crown. The praseodymium oxide catalyst was chosen as a candidate because of promising performance for burning dry carbon and to an extent SOF in model TGA/DTA lab tests. However, for the purposes of the present invention a variety of catalysts can be used, including other base metal and rare earth oxides, as well as, precious metals.

For all of the coatings, the surface of the metal part to be coated was first pretreated by grit blasting. This resulted in a clean, corrosion-free and roughened surface to insure good adhesion and mechanical interlocking of the plasma sprayed bond coat to the metal part.

Ceramic (catalyst) Coated Parts: The engine parts coated with ceramic (catalyzed) coatings for these tests included the following:

1. Piston Crowns: The pistons for these tests were standard commercial parts. The specific pistons initially had a compression ratio of 15:1. The top rim was relieved to avoid interference with the cylinder head coatings. The pistons were of a open bowl, low swirl profile. The piston crowns were plasma spray coated with Coatings A or B. Application of the plasma spray coating changed the dimensions and bowl volume of the piston crown slightly, thus the coated pistons were calculated to have a compression ratio of about 17:1. One set of Coating B coated pistons had the catalyst (praseodymium oxide) applied to make a set of Coating C coated pistons. The catalyst constituted a very thin coating and thus did not change the relative compression ratio of the pistons.

2. Engine Heads & Valves: The coatings were applied by the plasma spray process to the area of the engine cylinder heads enclosed by the combustion chambers ("fire deck"). During the coating process the exhaust valves were installed in the heads and seated. In this way both the "fire deck" region and the exhaust valve faces could be plasma spray coated simultaneously with Coatings A or B. One set of heads and valves which had been coated with Coating B had the catalyst (praseodymium oxide) coating applied to make a set of Coating C coated heads and valves. The exhaust ports on these heads had also been plasma spray coated with Coating B but did not have the praseodymium coating applied in that area of the head.

3. Exhaust Manifolds and Pre-Turbo Pipes: The plasma spray process is a line-of-sight process and as such it can be used to coat a part as long as the area of the part to be coated is accessible to the spray stream of the plasma spray gun. It is thus possible to spray the interior of parts, such at tubes and pipes, as long as the inner surface is accessible. Larger tubes (e.g. >about 2" id) can be coated through each end for lengths of up to 1–2 ft. Smaller tubes can be coated on the inside using special mini-guns or mini-torches. The plasma spray process can not; however, be used to coat around acute corners or in areas which can not be made accessible. The exhaust manifolds and pre-turbo connecting pipes for the DDC 6V92TA engine were large enough in diameter and straight enough that it was possible to coat the inner surface to a significant extent (about 75%) with the plasma spray coating of Coating B. One set of exhaust manifolds and pre-turbo pipes coated with Coating B had the catalyst (praseodymium oxide) also applied to make a set coated on the inner surface with Coating C.

The Exhaust Catalyst (DOC): A diesel oxidation catalytic converter is comprised of a catalyst coating, typically composed of a mixture of catalytically active base metal oxides and optional precious metals applied to the flow channel surfaces of a suitable monolithic honeycomb substrate. This substrate with the catalyst washcoat applied is contained within a metal canister (the can) designed to hold the substrate in place and allow for the flow of the exhaust gases from the engine to pass over the catalyst.

Current Production DOC (DOC-A): A current production catalyst for this application, designated "DOC-A" was obtained for comparative testing. This catalyst was coated onto an extruded cordierite ceramic honeycomb catalyst substrate measuring 9.5" dia.×6" long. The cell spacing was 200 cpsi, with a wall thickness of 12 mil. The geometric surface area was 13 m$^2$. The total catalyst washcoat loading was 2.95 g/in$^3$, for a total of 1254 g. The catalyst washcoat consisted of a bottom coat of 1.00 g/in$^3$ highly milled high surface area (150 m$^2$/g) alumina, with a pore volume of 0.5 cc/g. The topcoat included the same alumina (1.05 g/in$^3$) plus high surface area (150 m$^2$/g) aluminum-stabilized ceria (0.90 g/in$^3$), having a pore volume of 0.1 cc/g, with platinum at 10 g/ft$^3$ distributed equally on the alumina and ceria in the topcoat. This catalyst was broken-in (de-greened) on the engine overnight before testing.

Improved DOC (DOC-B): The improved catalyst used for this invention, designated "DOC-B" is comprised of high surface area, high pore volume bulk metal oxides of aluminum and cerium which in turn contain platinum impregnated on their surfaces. This catalyst was coated onto a metallic wrapped foil honeycomb substrate with the dimensions of 10.5" dia.×6" long. The cell spacing was 310 cpsi, with a wall thickness of 4 mil. The geometric surface area was 27 m$^2$. Such substrates are manufactured in Sweden by EcoCat, a subsidiary of Sandvik Steel, and are made in accordance with one or both of U.S. Pat. Nos. 4,633,936 and 5,085,268, both of which are incorporated herein by reference. As with DOC-A, the total catalyst loading was 2.95 g/in$^3$, but in this case for a total of 1534 g. The catalyst coating consisted of: [1] A thin "etch coat" of highly milled high surface area (150 m$^2$/g) alumina to insure good adherence of the catalyst washcoat to the metallic honeycomb surface; [2] An undercoat consisting of high surface area alumina mixed with high surface area aluminum-stabilized ceria (150 m$^2$/g) in a ratio of 34:66 by weight; and [3] A topcoat consisting of very high surface area and pore volume alumina (250–300 m$^2$/g) mixed with high surface area aluminum-stabilized ceria in a ratio of 54:46 by weight, and having platinum impregnated onto the alumina and ceria at about 0.3% by weight of the topcoat loading with the platinum distributed equally on the alumina and ceria in the top coat. This catalyst DOC-B was prepared and coated onto the metallic honeycomb substrate. The loading levels for this catalyst were as follows:

1. Etch coat of 0.20 g/in$^3$ highly milled high surface area alumina
2. Bottom coat of 0.60 g/in$^3$ of the high surface area alumina plus 0.20 g/in$^3$ of the high surface area ceria.
3. Topcoat of 1.05 g/in$^3$ of the very high surface area alumina plus 0.90 g/in$^3$ of the high surface area ceria and containing 10 g/ft$^3$ platinum distributed about 90% on the alumina and about 10% on the ceria in the topcoat.

The catalyst coated substrate was then put into a canister and broken in (de-greening) on a diesel engine for 40 hours prior to the tests.

Test Configurations: The DDC6V92TA MUI engine was set up with various configurations of ceramic (catalyzed) coatings and with and without aftertreatment catalysts (DOC's) to demonstrate the current invention and assess the relative contributions of the various components of the invention. The various configurations included: [A] Coated or uncoated piston crowns; [B] Coated or uncoated heads & valves; [C] Coated and uncoated exhaust manifolds and pre-turbo exhaust pipes; [D] Insulated exhaust pipes between the turbo-outlet and the exhaust catalyst (DOC); [E] Presence or absence of the exhaust catalyst (DOC) in the exhaust stream and [F] Type of exhaust catalyst (DOC), improved or production. The configurations (examples) tested are given in TABLE II which shows 9 Examples plus baselines. The examples are summarized as follows:

Example 1

The engine configuration which includes catalyzed Coating C on the piston crowns, heads and valves and in the exhaust manifolds and pre-turbo pipes, plus insulated exhaust pipes between the turbo-outlet and the DOC and with the improved diesel oxidation catalyst DOC-B.

Example 2

Same as Example 1 but using the production exhaust catalyst DOC-A instead of the improved DOC-B.

Example 3

Same as Example 1 but with stock, uncoated heads and valves.

Example 4

Same as Example 1 but without the insulation on the exhaust pipes between the turbo-outlet and the DOC.

Example 5

Same as Example 1 but with stock, uncoated exhaust manifolds and pre-turbo exhaust pipes.

Example 6

Same as Example 5 but without a diesel oxidation catalyst (DOC) in the exhaust stream.

Example 7

The engine configuration which includes non-catalyzed Coating B on the piston crowns, heads and valves and in the exhaust manifolds and pre-turbo pipes, plus the improved DOC-B.

Example 8

Same as Example 7 but with stock, uncoated exhaust manifolds and pre-turbo exhaust pipes.

Example 9

Same as Example 8 but without a diesel oxidation catalyst (DOC) in the exhaust stream.

Baseline

The current engine rebuilt to its baseline condition for a 1979 DDC6V92TA MUI and without coatings or a diesel oxidation catalyst (DOC) in the exhaust stream.

Baseline ('94)

This is included for comparison purposes and refers to DDC6V92TA MUI baseline engines tested in 1994. The engine was rebuilt to a 350 HP rating and again to a 277 HP rating with rebuild kits representative of a MY 1985 engine.

Test Results: The results of transient emissions tests for the configurations corresponding to the Examples listed in TABLE II above are given in TABLE III. The first column in TABLE III refers to the engine test configuration (Examples). The second column gives the throttle delay setting in inches (0.594" in each case here). The third column gives the injection timing used for the individual test run or set of test runs. The next column designates the type of HD transient test (cold start, hot start or composite). The next four columns give the brake specific emissions for gas phase HC's, CO, $NO_x$ and TPM, respectively. The next two columns give the breakdown of the TPM into insolubles and VOF components. The final column gives the brake specific fuel consumption for the test run.

In addition to the data in TABLE III the results for hot start transient tests for the examples are shown graphically in the bar chart in FIG. 2. These hot start results are all for the 1.466" fuel injection timing setting. FIG. 2 gives the average particulate emissions for each example, either as TPM or particulate breakdowns into insoluble and VOF portions, where available. As will be discussed further below in regard to the specific examples, catalyzed coatings in the exhaust train, particularly in the exhaust manifold and pre-turbo pipes, are particularly effective for reducing the insoluble soot component of the total particulate matter (TPM) emissions.

Figure 4:
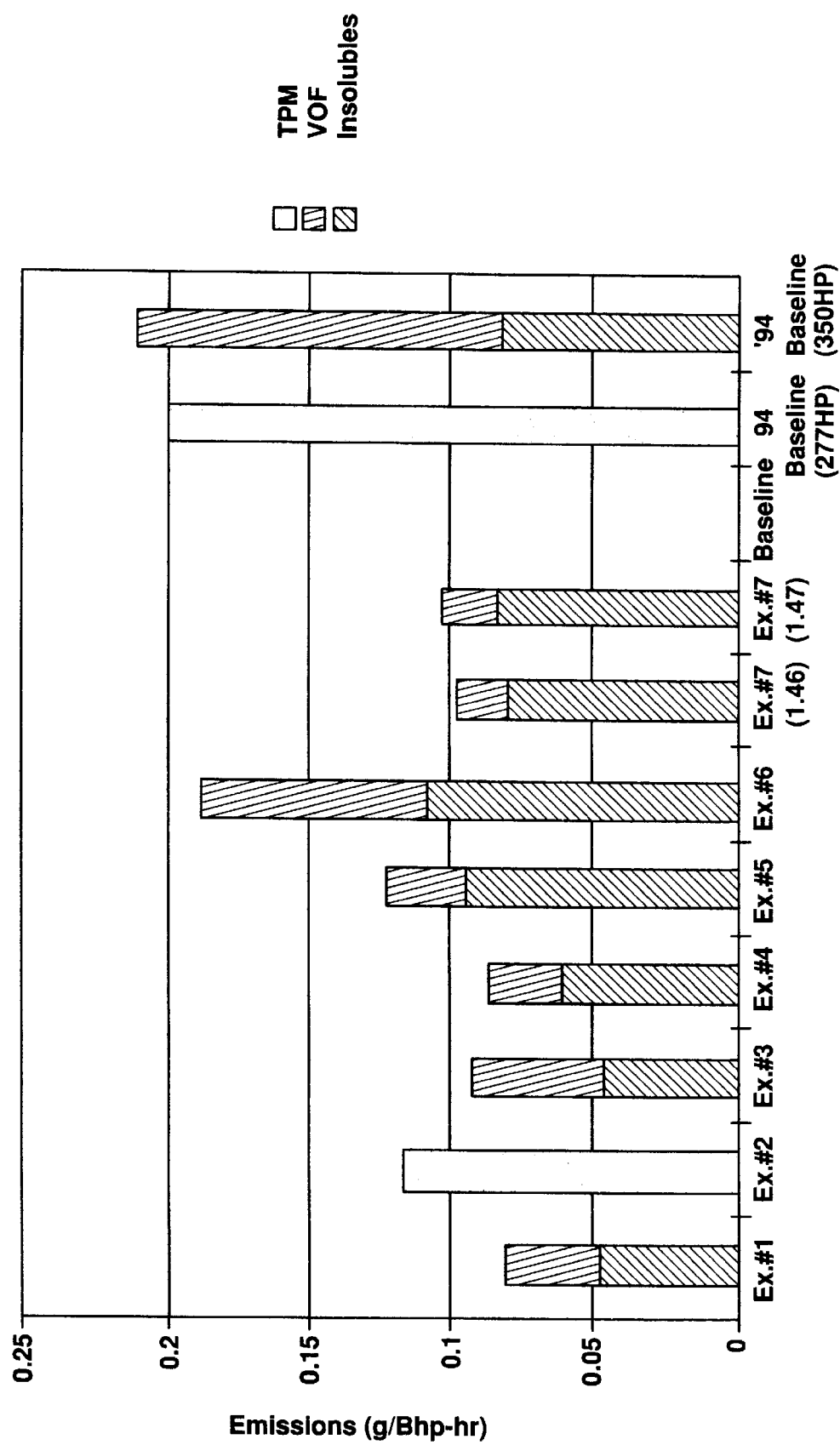
FIG. 4 is a comparative bar graph of different configurations of the present invention and comparative baseline data.

Results for Example 1, an example of the present invention, are given in TABLE III for injection timing settings from 1.460" to 1.520" (most retarded injection). As can be seen the 0.1 g/BHP-h TPM standard was readily met for injection settings of 1.460", 1.466" and 1.475". As the injection was progressively retarded the TPM emission level increased, but only slightly, and TPM emissions from 0.076 to 0.084 g/BHP-h were achieved. The technology used for the Example 1 configuration achieved dramatically lower TPM emissions compared with the baseline engine configurations with timing setting of 1.466" from 1994 tests. The baseline engines gave TPM emissions of at least 0.200 g/BHP-h. In the current tests retarding the injection timing was accompanied by reduction in NOx emissions. For Example 1 with injection timing settings of 1.466" and 1.475" lower $NO_x$ emissions were achieved (10.11 and 8.97 g/BHP-h, respectively) than for the '94 baseline engine configurations (10.3 to 11.7 a g/BHP-h) while maintaining TPM emissions well below the 0.1 g/BHP-h standard. The level of $NO_x$ emission could be reduced even further to 5.07 g/BHP-h (essentially the 1994 NOx emission standard) by additional retarding of injection timing to 1.520". This was accompanied by a level of TPM emissions (0.141 g/BHP-h) which exceeded the 0.1 g/BHP-h standard. However, it was still lower than the TPM emissions level from the baseline engine (>0.2 g/BHP-h). The relationship of both TPM and $NO_x$ emissions levels for Example 1 as a function of injection timing setting is shown graphically in FIG. 4. Example 1 with injection timing setting in the range of 1.466" to 1.475" appears to best fulfill the goals of meeting the 0.1 g/BHP-h TPM emissions with good $NO_x$ emissions levels. The TPM breakdown for Example 1 (1.4661") showed 0.049 g/BHP-h insolubles and 0.031 g/BHP-h VOF showing that this configuration gave substantial reduction in both fractions compared with the baseline results. The brake specific fuel consumption for Example 1 was found to be comparable or lower than that of the '94 baseline engine configurations showing that implementation of the technology of this invention is not accompanied by a fuel efficiency penalty.

The results for Example 2 show that when the larger volume (8.5 liter), improved DOC-B of this invention (on 10.5" dia.×6" long 310 cpsi metallic substrate) was replaced with the smaller volume (7.0 liter) production DOC-A (on 9.51" dia.×6" long 200 cpsi ceramic substrate), the TPM emissions increased to 0.116 g/BHP-h and the 0.1 g/BHP-h standard could not be achieved. It, therefore, appears that the improved catalyst exhibited a TPM emissions performance advantage of 0.037 g/BHP-h compared with the production catalyst. Although the TPM breakdown for Example 2 has not yet been determined it is expected that the improved catalyst gives higher VOF conversion than the production catalyst because of its improved washcoat properties and larger catalyst volume. The $NO_x$ emissions levels with the two catalysts were comparable. Gas phase HC emissions were about 20% lower with the improved catalyst. However, CO emissions were slightly higher, possibly due to partial oxidation of the greater relative amount of VOF and gas phase HC's converted by the improved catalyst. The brake specific fuel consumption for Example 2 was comparable with Example 1. These results show that the improved DOC-B and larger catalyst volume are key components for the best performance of the invention.

The results for Example 3 show that the engine configuration with the uncoated heads and valves run with an injection timing setting of 1.460" exhibited slightly higher levels of emissions than for Example 1 with coated heads and valves run at the same injection timing setting. The TPM emissions for Example 3 were ca 0.014 g/BHP-h higher than for Example 1. The composite $NO_x$ emission levels of Examples 3 and 1 were comparable for the 1.46" timing setting. However, gas phase HC's and CO were slightly higher for Example 3 than for Example 1. This indicated that the configuration with coated heads and valves was better for emissions performance, but the 0.1 g/BHP-h TPM emission goal could still be met with uncoated heads and valves and the configuration of Example 3 would be simpler and lower in cost from a manufacturing point of view. Thus Example 3 might be considered useful under some circumstances. The composite brake specific fuel consumption for Example 3 appears to be slightly lower than for Example 1, but this could be within the experimental error of the measurement.

For Example 4 the insulation was removed from the exhaust pipes between the turbo-outlet and the diesel oxidation catalyst(DOC). The cold start TPM emission result for Example 4 was about 15% higher than the cold start results for Example 1 showing the positive effect of the insulation on reducing emissions for the cold start test condition. The average hot start TPM emissions for Example 4 were also found to be slightly higher showing that the insulation has a positive overall effect on particulate emissions. TPM breakdowns show slightly higher insolubles and slightly lower VOF for Example 4 compared with Example 1. The reason for this is not fully understood, but could be related to inhibition of the development of insoluble related components in the hotter insulated exhaust pipes (Examples 1 & 3) compared with the un-insulated exhaust pipes (Example 4). The results for Example 4 show that it was not necessary to have the insulation in place to meet the 0.1/BHP-h TPM emission standard, but its beneficial effect can give a slightly greater delta TPM to allow for greater DF and better operation under cold ambient conditions. Composite $NO_x$ emission levels were comparable for Example 4 and Example 1. Surprisingly, gas phase HC and CO emissions were slightly lower without the insulation. The fuel consumption was comparable both with and without the insulation.

For Example 5 the Coating C coated exhaust manifolds and pre-turbo exhaust pipes of Example 1 were replaced with stock, uncoated manifolds and pre-turbo exhaust pipes. The test results showed that the TPM emission level for this configuration was substantially higher (0.121 g/BHP-h) than when the coated manifolds and pipes were used (0.080 g/BHP-h). The TPM performance advantage with the coated manifolds and pipes appears to be 0.041 g/BHP-h. Comparison of the TPM breakdowns for Examples 1 & 5 shows that the key contribution of the use of Coating C coated exhaust manifolds and pre-turbo pipes is in reduction in the insoluble portion of the particulates. The level of $NO_x$ emissions for Example 5 was comparable with that of Example 1 as was the brake specific fuel consumption levels. For Example 5 gas phase HC emissions were slightly lower and CO emissions were slightly higher than for Example 1. These results show that the coated exhaust manifolds and pre-turbo pipes were an important component contributing to the performance of the system which constitutes this invention. This was a surprising result in that intuitively one would not consider the inner surface of the exhaust manifolds and pipes as potentially having much effect on emissions considering the relatively low surface area. However, there are considerable changes in flow direction as the exhaust passes through the manifolds and pipes and the momentum of components of the particulates (VOF aerosols, dry carbon particles and carbon particles with adsorbed VOF) might cause them to impact on the inner walls at pipe bends and angle changes, thus allowing for interaction with the ceramic (catalyzed) coatings and burning.

For Example 6 the configuration consisted of Coating C coatings in the combustion chamber only. The coated exhaust manifolds and pre-turbo exhaust pipes were replaced with stock, uncoated manifolds and pipes as with Example 5, plus the diesel oxidation catalyst (DOC) was removed. The test results showed relatively high TPM emissions level for this configuration (0.188 g/BHP-h), compared with Example 5 and especially compared with Example 1. Compared with Example 5, it appeared that the TPM emissions performance advantage with the diesel oxidation catalyst (DOC) was 0.067 g/BHP-h. Compared with Example 1, it appears that the TPM emissions performance advantage for the coated exhaust manifolds and pre-turbo pipes plus the diesel oxidation catalyst was a total of ca 0.108 g/BHP-h. The TPM breakdown for Example 6 shows that nearly all of the increased TPM emission compared with Example 5 was due to greater VOF contribution. This is consistent with the high VOF removal performance observed with the DOC present. Comparing Example 6 with the baseline engine configurations indicates that the TPM emissions performance advantage for the combustion chamber coatings alone was about 0.012–0.013 g/BHP-h. The emission levels of $NO_x$ and brake specific fuel consumption for Example 6 were comparable with those for Examples 1–5 at the equivalent injection timing setting.

The results of these tests show that substantial reduction in TPM emissions for a 2-cycle DDC 6V92TA MUI bus engine can be dramatically reduced and the 0.1/BHP-h TPM standard can be met with the technology described in this invention record. The key components of the invention appear to be the improved diesel oxidation catalyst (DOC), the ceramic (catalyzed) coatings on the inner surfaces of the exhaust manifolds and pre-turbo exhaust pipes and the ceramic (catalyzed) by coatings on the combustion chamber surfaces (piston crowns, heads and valves). Each of these components has its own incremental effect on reducing the dry carbon and VOF portions of the TPM emissions. We believe that the combination of components used to achieve these results provides a system capable of significant reduction in TPM emissions from diesel engines. This coupled with the possibilities of reducing $NO_x$ via injection retard without great increases in TPM emissions gives a system to address the two key emissions challenges for diesel engines, namely TPM and $NO_x$.

$NO_x$ Benefits

Figure 5:
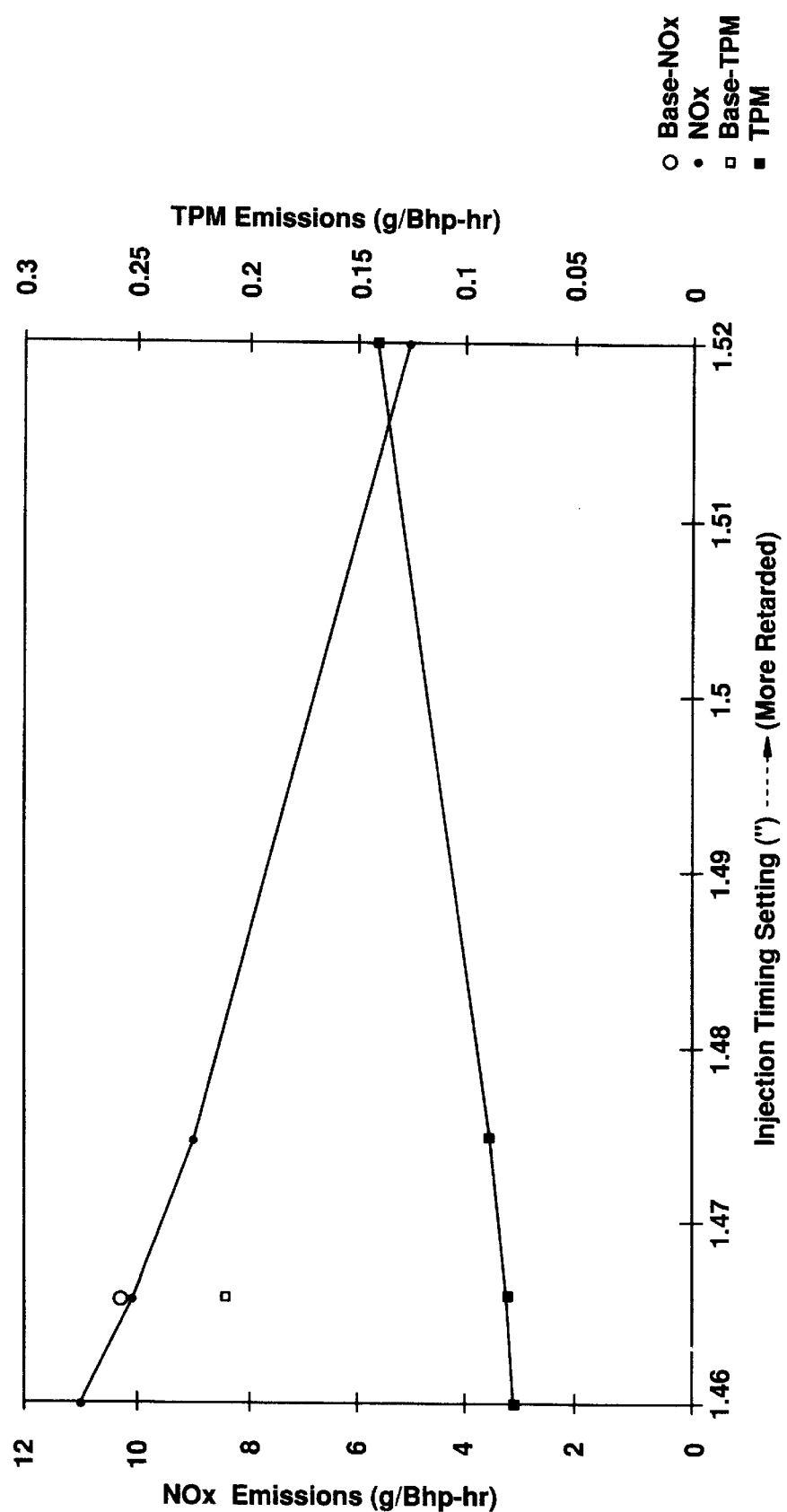
FIG. 5 is a graph showing the comparative effects of the injection timing setting on TPM and NOX emission levels.

The $NO_x$ and TPM trade-off is well known in industry. Each diesel engine model will produce a set of $NO_x$ and TPM emissions depending on the engine parameters. This set of $NO_x$ and TPM values can be plotted as shown in FIG. 5, which is a representation of the values reported for Example 1, in Table III, compared to the Baseline (350 HP) values. Engineers calibrate engines to achieve the desired balance of $NO_x$-TPM emissions by adjusting various engine operating parameters. The primary engine parameter is the timing of fuel injection, which is the time during the cycle at which diesel fuel begins to enter the combustion chamber. Retarding the injection (i.e., starting injection later in the cycle) has the well-known effect of reducing NOx at the expense of increasing TPM. The results depicted in FIG. 1 show that the system of the present invention can significantly reduce $NO_x$ levels with only a relatively small increase in TPM emissions.

TABLE II

Description of Emissions Control Systems Tested

|  | Piston Coating | Head & Valve Coating | Pre-Turbo Manifold & Pipes Coating | Insulated Post-Turbo Exhaust Pipes | Catalyst |
|---|---|---|---|---|---|
| Example 1 | Coating C | Coating C | Coating C | Yes | DOC-B |
| Example 2 | Coating C | Coating C | Coating C | Yes | DOC-A |
| Example 3 | Coating C | None | Coating C | Yes | DOC-B |
| Example 4 | Coating C | Coating C | Coating C | No | DOC-B |
| Example 5 | Coating C | Coating C | None | Yes | DOC-B |
| Example 6 | Coating C | Coating C | None | Yes | None |
| Example 7 | Coating B | Coating B | Coating B | No | DOC-B |
| Example 8 | Coating B | Coating B | None | No | DOC-B |
| Example 9 | Coating B | Coating B | None | No | None |
| Baseline | None | None | None | None | None |
| Baseline ('94) (277 & 350 HP) | None | None | None | None | None |

TABLE III

Summary of HD Transient Engine Emissions Tests

| | Throttle Delay (") | Injection Timing (") | Transient Test Type | Measured Emissions (g/BHP-h) | | | | TPM Breakdown | | BSFC |
|---|---|---|---|---|---|---|---|---|---|---|
| | | | | HC | CO | NOx | TPM | Insolubles | VOF | (lb/BHP-h) |
| Ex. 1 | 0.594 | 1.46 | Cold-3 | 0.172 | 0.401 | 10.65 | 0.076 | | | 0.458 |
| | | | Hot-4 | 0.161 | 0.254 | 10.93 | 0.077 | 0.058 | 0.019 | 0.44 |
| | | | Hot-5 | 0.162 | 0.275 | 11.06 | 0.079 | | | 0.438 |
| | | | Comp. | 0.162 | 0.274 | 10.89 | 0.077 | | | 0.442 |
| | 0.594 | 1.466 | Cold-4 | 0.219 | 0.524 | 9.94 | 0.076 | 0.043 | 0.033 | 0.453 |
| | | | Hot-8 | 0.154 | 0.422 | 10.14 | 0.08 | 0.049 | 0.031 | 0.436 |
| | | | Hot-9 | 0.173 | 0.431 | 10.09 | 0.081 | 0.049 | 0.032 | 0.431 |
| | | | Comp. | 0.163 | 0.436 | 10.11 | 0.08 | 0.049 | 0.031 | 0.438 |
| | 0.594 | 1.475 | Hot-6 | 0.17 | 0.309 | 8.97 | 0.089 | 0.054 | 0.03 | 0.442 |
| | 0.594 | 1.52 | Hot-19 | 0.1 | 0.31 | 5.07 | 0.141 | 0.122 | 0.019 | 0.449 |
| Ex. 2 | 0.594 | 1.466 | Hot-15 | 0.201 | 0.41 | 10.32 | 0.116 | 0.081 | 0.035 | 0.439 |
| Ex. 3 | 0.594 | 1.46 | Cold-2 | 0.215 | 0.481 | 10.3 | 0.089 | 0.042 | 0.047 | 0.457 |
| | | | Hot-2 | 0.203 | 0.422 | 10.91 | 0.092 | 0.046 | 0.046 | 0.425 |
| | | | Hot-3 | 0.208 | 0.473 | 10.89 | 0.092 | 0.045 | 0.047 | 0.43 |
| | | | Comp. | 0.205 | 0.43 | 10.83 | 0.091 | 0.046 | 0.046 | 0.429 |
| Ex. 4 | 0.594 | 1.466 | Cold-5 | 0.17 | 0.48 | 9.8 | 0.083 | | | 0.457 |
| | | | Hot-16 | 0.154 | 0.359 | 10.17 | 0.08 | 0.054 | 0.026 | 0.433 |
| | | | Hot-20 | 0.15 | 0.51 | 10.22 | 0.09 | 0.065 | 0.025 | 0.441 |
| | | | Hot-21 | 0.15 | 0.49 | 10.21 | 0.089 | | | 0.439 |
| | | | Comp. | 0.15 | 0.51 | 10.16 | 0.09 | | | 0.443 |
| Ex. 5 | 0.594 | 1.466 | Hot-17 | 0.135 | 0.509 | 10.1 | 0.121 | 0.094 | 0.027 | 0.437 |
| Ex. 6 | 0.594 | 1.466 | Hot-18 | 0.358 | 1.298 | 10.2 | 0.188 | 0.108 | 0.08 | 0.439 |
| Ex. 7 | 0.594 | 1.46 | Hot-31 | | | 10.7 | 0.097 | 0.079 | 0.018 | |
| | | 1.47 | Hot-29 | 0.16 | 0.59 | 9.87 | 0.102 | 0.083 | 0.019 | 0.436 |
| | | 1.485 | Hot-32 | | | 7.8 | 0.14 | 0.128 | 0.015 | |
| | | 1.5 | Hot-33 | | | 6.5 | 0.18 | 0.157 | 0.019 | |
| Ex. 8 | 0.594 | 1.47 | Hot-40 | 0.185 | 0.81 | 9.72 | 0.116 | 0.0974 | 0.0186 | 0.441 |
| Ex. 9 | 0.594 | 1.47 | Hot-39 | 0.413 | 1.481 | 9.84 | 0.191 | | | 0.441 |
| Baseline | 0.594 | 1.466 | Cold | | | | | | | |
| | | | Hot | | | | | | | |
| | | | Hot | | | | | | | |
| | | | Comp. | | | | | | | |
| Baseline ('94) 350 HP | 0.594 | 1.466 | Cold | 0.5 | 0.9 | 10.3 | 0.2 | 0.07 | 0.13 | 0.441 |
| | | | Hot | 0.5 | 1.6 | 10.3 | 0.21 | 0.08 | 0.13 | 0.422 |
| | | | Comp. | 0.5 | 1.5 | 10.3 | 0.21 | 0.08 | 0.13 | 0.424 |
| Baseline ('94) 277 HP | 0.636" | 1.466" | Cold | 0.5 | 1.7 | 11.6 | 0.24 | | | 0.494 |
| | | | Hot | 0.5 | 0.8 | 11.7 | 0.2 | | | 0.451 |
| | | | Comp. 0.457 | 0.5 | 0.9 | 11.7 | 0.2 | | | |

Example 10

This example illustrates the incremental improvement of emissions performance (particularly particulate emissions) obtained with in-cylinder thermal barrier coating and more so with catalyzed thermal barrier coatings. This effect was shown by engine emissions testing using the U.S. Heavy Duty Transient Test Procedure, as previously discussed.

A 1986 DDC6V92-TA MUI engine was rebuilt using standard rebuild kit parts. This engine was built to a 294 HP configuration, and fitted with 9F-80 fuel injectors and 17:1 compression ratio pistons. The engine was run with a fuel injection timing setting of 1.460" (injector height in inches) and a throttle delay of 0.636" (throttle actuator adjustment in inches). The engine was equipped with a standard exhaust system and no after treatment catalyst was used. In this way the baseline engine-out emissions of a standard engine rebuild were evaluated. The engine was broken in for the required 100 hrs and then tested for emissions in hot start transient test runs.

Next the engine was rebuilt again, but was equipped with uncatalyzed thermal barrier coatings (the above "Coating B") on all piston crowns, the head firedecks and exhaust valve faces. (The inlet valves, which are located in the cylinder side walls of this engine rather than in the head, were not coated.) This engine, also 294 HP, was fitted with 9F-80 fuel injectors and the compression ratio with the coatings was 17:1 as with the standard rebuild, above. This coated engine was also run with a fuel injection timing setting of 1.460" and a throttle delay of 0.636". This engine was run with the same standard exhaust system as used for the standard rebuild, above. the engine was broken in for 100 hrs and tested for emissions performance in hot start transients.

Next the engine was rebuilt again, but this time it was equipped with catalyzed thermal barrier coatings (the above "Coating C") on all piston crowns, the firedecks and valves. The catalyst was $Pr_6O_{11}$ as described previously for "Coating C". This engine was built to a 294 HP configuration with 9F-80 fuel injectors and compression ratio of 17:1 as with the standard rebuild and uncatalyzed thermal barrier coating rebuild, discussed above. The engine was equipped with the same standard exhaust train used for the standard build and uncatalyzed thermal barrier coated engines, above. This engine was broken in and tested for emissions performance in hot start transient tests.

As is apparent for the three engine builds described above, as much care was taken as possible to have the builds be identical and the engines run in the same way with the only key variable being the in-cylinder, combustion chamber surface coatings.

The emissions results of the hot start transient tests for the three engine builds described above are shown in TABLE IV below:

TABLE IV

| Engine Configuration and Run No. | Emissions (g/BHP-h) | | | |
|---|---|---|---|---|
| | HC | CO | NOx | PM |
| Standard Rebuild | | | | |
| 1 | 0.50 | 1.45 | 11.44 | 0.193 |
| 2 | 0.50 | 1.47 | 11.50 | 0.194 |
| 3 | 0.51 | 1.57 | 11.28 | 0.200 |
| 4 | 0.51 | 1.56 | 11.15 | 0.195 |
| Avg. | 0.51 | 1.51 | 11.34 | 0.196 ± 0.003 |
| Uncatalyzed Coating ("Coating B") | | | | |
| 1 | 0.58 | 1.21 | 11.05 | 0.185 |
| 2 | 0.58 | 1.23 | 10.90 | 0.188 |
| 3 | 0.58 | 1.17 | 11.10 | 0.185 |
| Avg. | 0.58 | 1.21 | 11.05 | 0.186 ± 0.001 |
| Catalyzed Coating ("Coating C") | | | | |
| 1 | 0.57 | 1.04 | 10.70 | 0.170 |
| 2 | 0.58 | 1.13 | 10.70 | 0.176 |
| Avg. | 0.58 | 1.09 | 10.70 | 0.173 ± 0.003 |

As can be seen the average particulate emissions level of the engine coated with the uncatalyzed coating ("Coating B") was lower than the average particulate emissions level of the standard rebuild engine by 0.010 g/BHP-h. Furthermore, the average particulate emissions for the engine coated with the catalyzed coating ("Coating C") was lower than average particulate emissions for the engine coated with the uncatalyzed coating ("Coating B") by 0.013 g/BHP-h. The emissions ranges (average ±2 sigma) for each of these engines do not overlap and thus are significantly different. These results show that the catalyzed coatings give a real and distinct effect in reducing the particulate emissions for the diesel engine.

Example 11
Stainless Steel Bond Coats:

Experiments were conducted to test thermal barrier coatings for resistance to rapid thermal cycling using various bond coats for bonding a standard 7% yttria stabilized zirconia ceramic top coat to an aluminum substrate, simulating the conditions to which an aluminum piston would be exposed in operation in a diesel engine. Based on manufactures literature, the ceramic is considered to have a coefficient of thermal expansion (CTE) of about 7.6, while the aluminum substrate has a CTE of about 23.0. A "thermal cycle machine" was developed to perform the tests. The device was made to move a test sample between a heat source and a cooling flow for a programmable period of time in order to simulate typical engine run conditions. In the case of the evaluation of aluminum piston bond coats, a three-inch diameter disk sample is used. This is coated on one face with the bond coat and ceramic top coat system for the purpose of seeing if the top coat will remain adherent to the bond layer. The heat source is a large propane air burner whose flame impinges directly on the coated disk. Cooling is done by a high volume compressed air flow. In operation the test disk is shuttled back and forth between the heat and cool locations for timed durations that allow a range of 900° F. (high) to 200° F. (low) to be reached. A cycle was developed in which a 2.5 minute dwell in each station achieved the target temperatures.

Four bond materials were chosen for this experiment. In each case, the bond coat was applied by plasma spraying the metal in powder form onto the aluminum disk. The materials tested were Nichrome® (80%Ni/20%Cr) alloy (Metco 43C), having a CTE of about 7.3; 95% nickel/5% aluminum alloy (Metco 480), having a CTE of about 10; NiCrAlY (Praxair 211), having a CTE of about 13.0; and type 431 martensitic stainless steel (Metco 42C), having a CTE of about 6.6. For each sample, the number of thermal cycles to failure was measured. For purposes of this test, coating failure is considered when the top coat begins chipping and separating from the bond coat. The Nichrome sample failed after 47 cycles; the nickel/aluminum sample after 83 cycles; the NiCrAlY sample after 23 cycles; and the stainless steel sample still had not failed after 123 cycles, at which time the test was discontinued. This showed the distinct improvement obtained by using a stainless steel bond coat under simulated engine conditions to bond a ceramic coat to aluminum, particularly a "low-shrink" martensitic steel such as type 431 SS.

We claim:

1. A ceramic thermal barrier coating for a metallic substrate comprises a mullite top coat and a bond coat comprising a martensitic stainless steel.

2. The ceramic thermal barrier coating of claim 1 further comprising an yttria stabilized zirconia intermediate coat between the mullite top coat and the stainless steel bond coat.

3. The ceramic thermal barrier coating of claim 1 further comprising an oxidation catalyst provided at the surface of the mullite top coat.

4. A method of providing a ceramic thermal barrier coating on a metallic substrate, the barrier coating comprising a martensitic stainless steel bond coat on which an intermediate coat is deposited, and the method comprising depositing a mullite top coat onto the intermediate coat.

5. The method of claim 4 further comprising providing an oxidation catalyst at the surface of the mullite top coat.

6. The method of claim 4 wherein the thermal barrier coating further comprises an yttria stabilized zirconia intermediate coat onto which the mullite top coat is deposited.

7. The method of claim 4 including providing an oxidation catalyst at the surface of the mullite top coat.

* * * * *